(12) United States Patent
Kwon et al.

(10) Patent No.: US 10,021,297 B2
(45) Date of Patent: Jul. 10, 2018

(54) MOBILE TERMINAL AND CONTROL METHOD THEREOF

(71) Applicant: LG ELECTRONICS INC., Seoul (KR)

(72) Inventors: Yunmi Kwon, Seoul (KR); Kiseon Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 299 days.

(21) Appl. No.: 14/929,025

(22) Filed: Oct. 30, 2015

(65) Prior Publication Data

US 2017/0026574 A1   Jan. 26, 2017

(30) Foreign Application Priority Data

Jul. 21, 2015   (KR) .................. 10-2015-0103311

(51) Int. Cl.
*H04N 7/00* (2011.01)
*H04N 5/232* (2006.01)
*H04N 5/225* (2006.01)
*G06F 3/00* (2006.01)
*G06F 3/01* (2006.01)
*G06F 3/0481* (2013.01)
(Continued)

(52) U.S. Cl.
CPC ......... *H04N 5/23238* (2013.01); *G06F 3/005* (2013.01); *G06F 3/017* (2013.01); *G06F 3/04815* (2013.01); *G06F 3/04845* (2013.01); *G06F 3/04883* (2013.01); *H04N 5/2258* (2013.01); *H04N 5/23216* (2013.01); *H04N 5/23222* (2013.01); *H04N 5/23293* (2013.01)

(58) Field of Classification Search
CPC .................................................. H04N 5/23238
See application file for complete search history.

(56) References Cited

U.S. PATENT DOCUMENTS

2009/0021576 A1   1/2009   Linder et al.
2013/0165194 A1*  6/2013   Nojiri .................... A63F 13/10
                                                         463/5
(Continued)

FOREIGN PATENT DOCUMENTS

KR   20150078873   7/2015

OTHER PUBLICATIONS

European Patent Office Application Serial No. 15003094.8, Search Report dated Mar. 30, 2017, 9 pages.

*Primary Examiner* — Tracy Y Li
(74) *Attorney, Agent, or Firm* — Lee, Hong, Degerman, Kang & Waimey

(57) ABSTRACT

The present invention relates to a mobile terminal which includes a camera and a touch screen and can output an image captured by the camera on the touch screen, and a control method of the mobile terminal. The mobile terminal includes a camera, a sensor, a memory, a touch screen and a controller configured to cause the touch screen to display a first image received via the camera, cause the memory to temporarily store the first image displayed on the touch screen, generate a second image comprising a conflation of at least part of the first image and a plurality of consecutive images sequentially received via the camera in response to sensing by the sensor of first movement of the mobile terminal about a subject included in the first image, and cause the memory to store the second image.

20 Claims, 40 Drawing Sheets

(51) Int. Cl.
*G06F 3/0484* (2013.01)
*G06F 3/0488* (2013.01)

(56) References Cited

U.S. PATENT DOCUMENTS

| | | | |
|---|---|---|---|
| 2014/0267387 A1* | 9/2014 | Bae | G06F 3/04845 345/625 |
| 2014/0300693 A1* | 10/2014 | Hirata | H04N 5/23216 348/39 |
| 2015/0022559 A1 | 1/2015 | Kim | |
| 2015/0049019 A1* | 2/2015 | Sawai | G06F 3/0346 345/158 |
| 2015/0062289 A1* | 3/2015 | Yoo | H04N 5/23238 348/36 |
| 2015/0215532 A1* | 7/2015 | Jafarzadeh | H04N 5/23238 348/36 |

\* cited by examiner (a)

(b)

⇓

(a)

AREA IN WHICH PHOTOGRAPHING IS MADE

AREA IN WHICH PHOTOGRAPHING IS NOT MADE (b)

(a)

(b)

(a)

(b)

MOBILE TERMINAL AND CONTROL METHOD THEREOF

CROSS-REFERENCE TO RELATED APPLICATIONS

Pursuant to 35 U.S.C. § 119(a), this application claims the benefit of earlier filing date and right of priority to Korean Application No. 10-2015-0103311, filed on Jul. 21, 2015, the contents of which is incorporated by reference herein in its entirety.

BACKGROUND OF THE INVENTION

1. Field of the Invention

The present disclosure relates to a mobile terminal which includes a camera and a touch screen and can output an image captured by the camera on the touch screen, and a control method of the mobile terminal.

2. Description of the Conventional Art

In general, a terminal may be classified into a mobile (portable) terminal and a stationary terminal according to a moveable state. The mobile terminal may be also classified into a handheld terminal and a vehicle mount terminal according to a user's carriage method.

As functions of the terminal become more diversified, the terminal can support more complicated functions such as capturing images or video, reproducing music or video files, playing games and receiving broadcast signals. By comprehensively and collectively implementing such functions, the mobile terminal may be embodied in the form of a multimedia player or a device. Various attempts have been made to implement complicated functions in such a multimedia device by means of hardware or software.

Owing to such an improvement, the mobile terminal provides various photographing functions using a camera provided in a main body thereof. Panorama photography is used as an example of the various photographing functions. The panorama photography refers to a technique of photographing a picture which is longer than a general picture in left, right, up, and down directions, in order to photograph large landscapes in one picture. In general, a panorama picture is completed by attaching a plurality of pictures, which are obtained by partially photographing a subject in turn, to each other in a transverse or longitudinal direction.

Since the panorama picture is displayed by two-dimensionally synthesizing a plurality of pictures, the panorama picture cannot provide a sufficient perspective. Also, the panorama picture cannot express a three-dimensional spatial sense of a subject. The reason is that, in the panorama photography, scenery around a subject is photographed not through rotation about the subject but through rotation about a camera.

SUMMARY OF THE INVENTION

Therefore, an aspect of the detailed description is to provide a mobile terminal which generates a processed image in which a user can feel a perspective of a subject by photographing continuous images without any specific control command, and a control method of the mobile terminal.

Another aspect of the detailed description is to provide a mobile terminal which can display a plurality of images of a subject and control the plurality of images based on a user's gesture, and a control method of the mobile terminal.

Still another aspect of the detailed description is to provide a mobile terminal which can adjust the reproduction speed of a plurality of images according to the kind of a subject included in the images, and a control method of the mobile terminal.

To achieve these and other advantages and in accordance with the purpose of this specification, as embodied and broadly described herein, a mobile terminal may include a camera, a sensor, a memory, a touch screen and a controller, wherein the controller is configured to cause the touch screen to display a first image received via the camera, cause the memory to temporarily store the first image displayed on the touch screen, generate a second image comprising a conflation of at least part of the first image and a plurality of consecutive images sequentially received via the camera in response to sensing by the sensor of first movement of the mobile terminal about a subject included in the first image and cause the memory to store the second image.

The mobile terminal and the control method thereof according to the present disclosure have advantages as follows.

According to the present disclosure, a plurality of images of a subject can be displayed such that a user can feel a perspective or spatial sense of the subject. Thus, it is possible to provide more stereoscopic displays. Further, the mobile terminal according to the present disclosure can intuitively display a plurality of images photographed at various angles in response to a user's gesture, and mutually display the plurality of images with the user.

Also, according to the present disclosure, when a movement of the main body moving around a subject is sensed after the subject is photographed, a plurality of images including the subject are photographed. Thus, the user can be provided with a processed image through which the user can feel a perspective of the subject without applying a specific control command.

Further scope of applicability of the present application will become more apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from the detailed description.

BRIEF DESCRIPTION OF THE DRAWING

The accompanying drawings, which are included to provide a further understanding of the disclosure and are incorporated in and constitute a part of this specification, illustrate exemplary embodiments and together with the description serve to explain the principles of the disclosure.

In the drawings.

DETAILED DESCRIPTION OF EXEMPLARY EMBODIMENTS

Figure 1A:
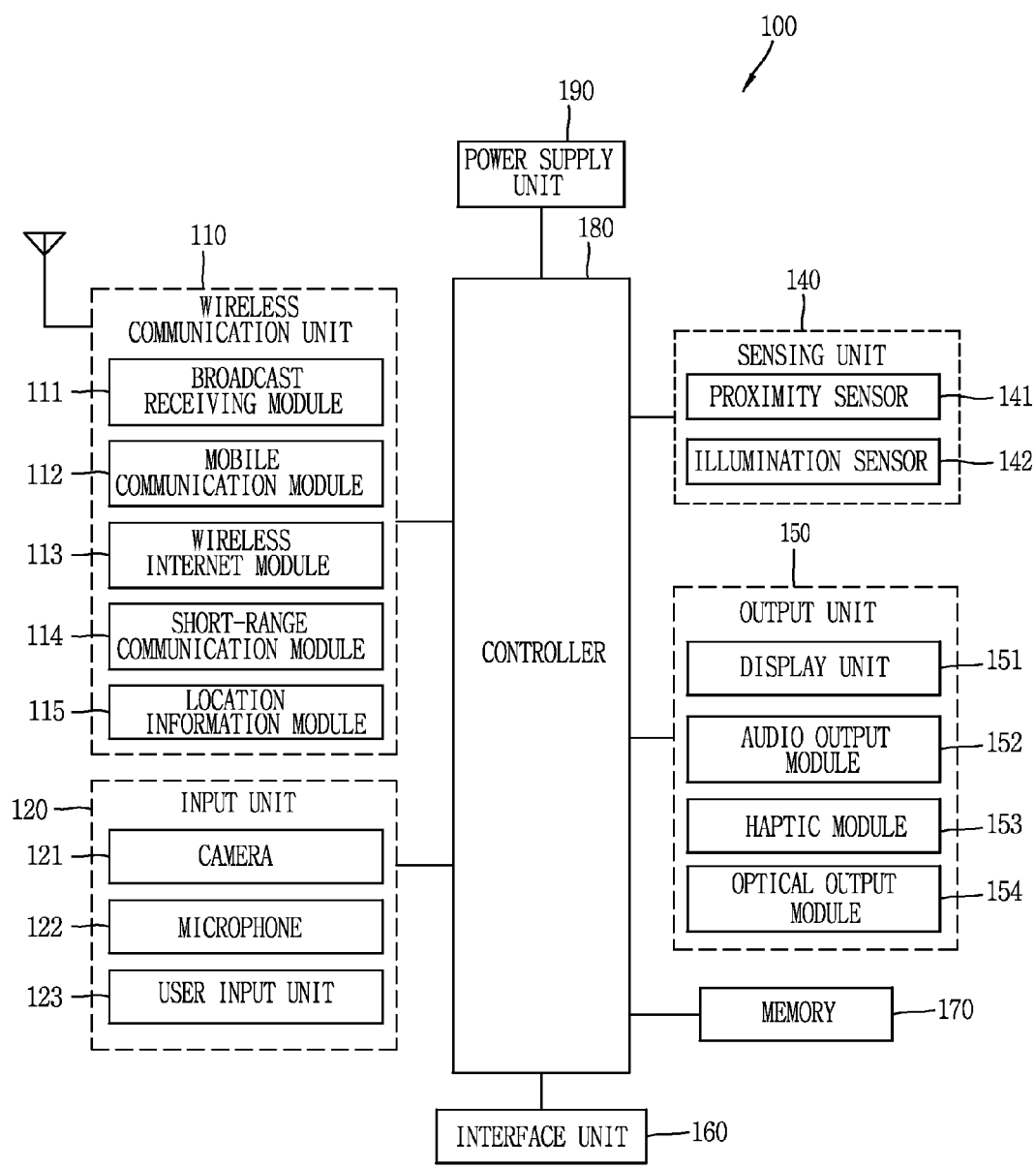
FIG. 1A is a block diagram illustrating a mobile terminal according to an exemplary embodiment.

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1B:
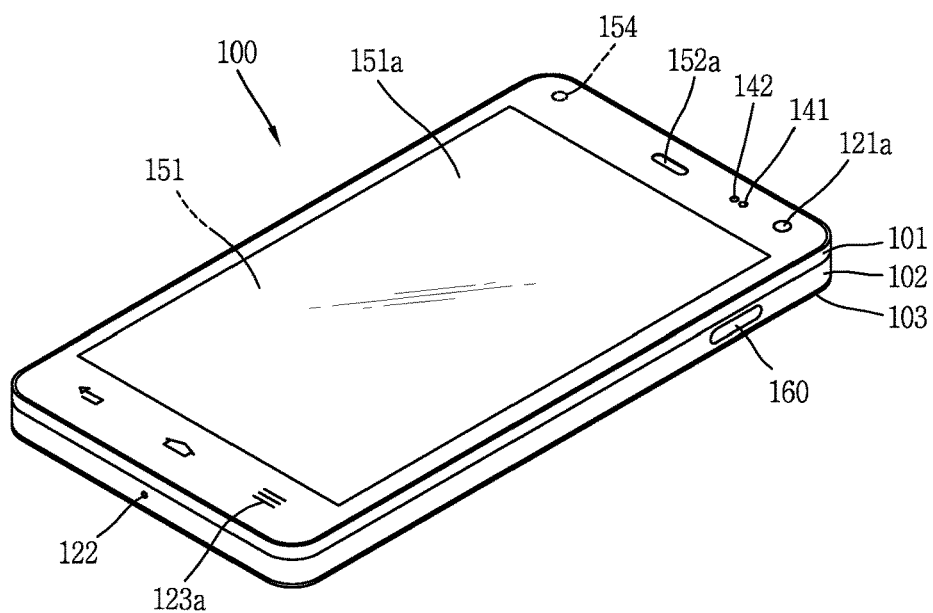
FIGS. 1B and 1C are conceptual diagrams illustrating an example of the mobile terminal viewed in different directions according to an exemplary embodiment.
Figure 1C:
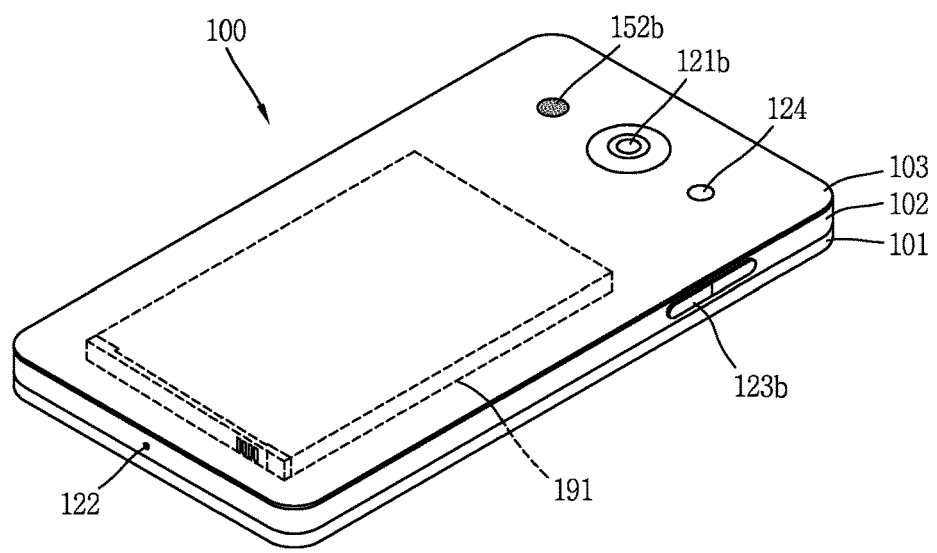

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method for a glass type terminal according to various embodiments to be explained later. The operation or the control method for the glass type terminal may be implemented on the glass type terminal by driving at least one application program stored in the memory 170.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

The camera 121 and the touch screen 151 will be again described. An image captured through the camera 121 is output in real time on the touch screen 151 under control of the controller 180.

The controller 180 may provide various photographing functions related to the camera 121, and one of the various photographing functions is panorama photography. The controller 180 completes a panorama picture by attaching a plurality of pictures, which the camera 121 captures while moving, to each other in a transverse or longitudinal direction. Also, the controller 180 may reconstruct pictures photographed in the same place as a 3D panorama moving picture.

The panorama photography is a technique for photographing circumstances around a photographer by rotating a camera up to a maximum of 360 degrees about the photographer. The panorama photography is used to photograph scenery. That is, a user photographs a subject located at a long distance while moving the camera 121, thereby acquiring a panorama picture or a panorama moving picture.

However, the panorama photography employs a method in which images captured by the camera 121 are two-dimensionally spread, regardless of the distance from the location of the camera to a background, and hence the photographer does not feel any perspective. Therefore, there is a limitation in providing a perspective or spatial sense of a subject.

For example, as online shopping becomes popular, the importance of images of products sold online becomes higher. Since a purchaser does not touch an actual product, the purchaser is to determine whether to purchase the actual product based on only an image of the actual product. Accordingly, a user's demand for a mobile terminal capable of photographing or displaying a plurality of images of a product such that a user can feel a spatial sense of the product comes into the limelight.

The present disclosure provides a mobile terminal which can photograph and output a plurality of images of a subject such that a user can feel a perspective of the subject, and a control method of the mobile terminal. Specifically, the present disclosure provides a mobile terminal which can continuously photograph a plurality of images of a subject in left, right, up, and down directions around the subject and output the plurality of photographed images such that a user can feel a perspective of the subject, and a control method of the mobile terminal.

Figure 2A:
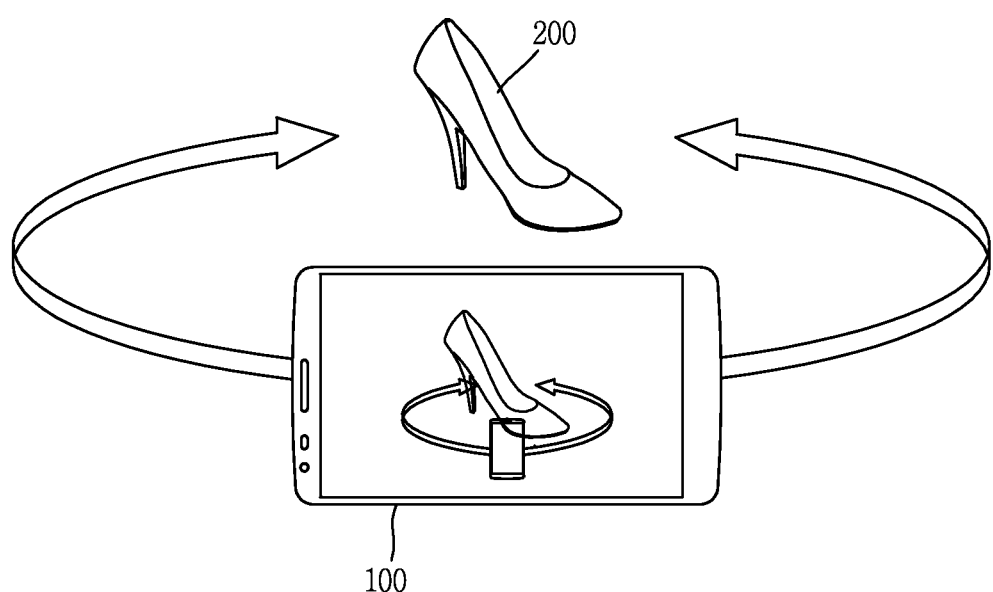
FIGS. 2A and 2B are diagrams illustrating in detail a case where a camera photographs a subject while moving around the subject.
Figure 2B:
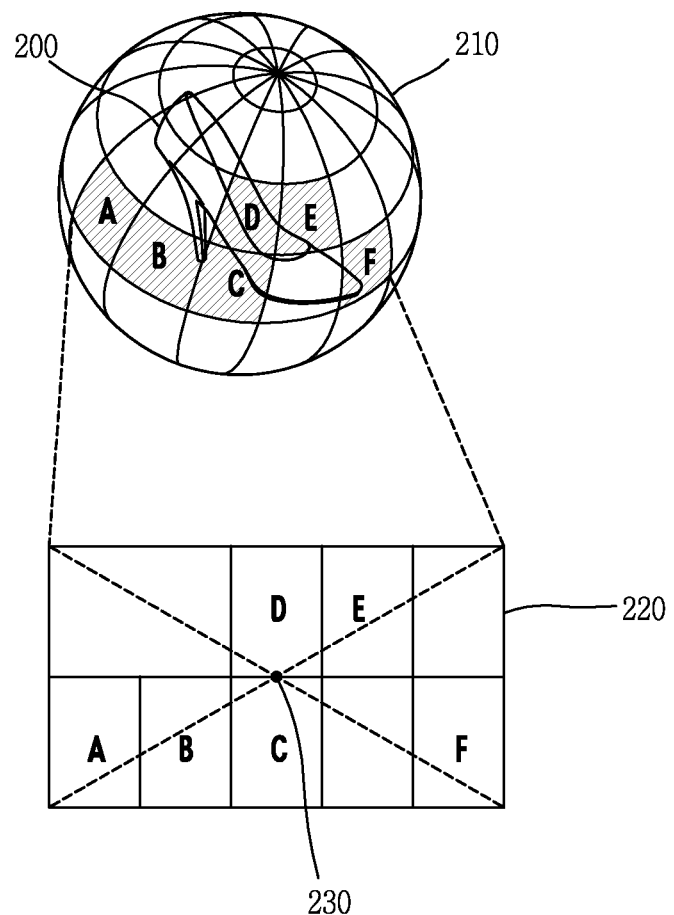

FIGS. 2A and 2B are diagrams illustrating in detail a case where a camera photographs a subject while moving around the subject.

As shown in FIG. 2A, when a 3D picture of a subject 200 is photographed, a photographer is to perform photographing while rotating about the subject. That is, a user is to photograph a plurality of images of a subject by using a camera provided in the mobile terminal while moving around the subject.

In order to form a perspective of a subject through a plurality of images, a plurality of images are obtained by photographing a subject at various angles from a predetermined distance. That is, the camera is to perform 360-degree photographing while moving in left, right, up, and down directions in a state in which the camera maintains a predetermined distance from the subject 200. For example, as shown in FIG. 2B, the user may continuously photograph the subject 200 while moving in an order of A→F, or may discontinuously photograph images corresponding to A to F regardless of a photographing order.

In this case, when the user continuously photographs the subject 200 while moving in the order of A→F, the user may photograph still images corresponding to A to F, or may photograph the still images as a moving picture. Since a moving picture is composed of a plurality of still images, a plurality of images which will be mentioned hereinbelow include a moving picture.

The plurality of images which the user photographs while moving around the subject 200 form a virtual view 210 which forms a perspective of the subject 200. If the plurality of images are sequentially output on the touch screen 151, the user has a feeling as if the user views the virtual view 210, and feels the perspective of the subject 200.

Meanwhile, the plurality of images have unique location information for forming the virtual view 210. Specifically, the controller 180 acquires an image in photographing and simultaneously calculates location information corresponding to the acquired image.

As an example, when the user continuously photographs images of the subject 200 while moving in the order of A→F, the controller 180 may sense a movement of the main body moving from A to F by using a signal generated by the sensing unit (see FIG. 1A). The controller 180 extracts a relative movement value of the main body by using the sensing unit 140 and calculates relative locations of A to F by analyzing the images.

As another example, when the user discontinuously photographs images corresponding to A to F in an arbitrary order, the controller 180 may acquire location information at the point of time when the photographing is performed by using the location information module 115 (see FIG. 1A). The controller 180 calculates locations at which the plurality of images are photographed by using absolute location information provided through GPS, etc., and hence the virtual view 210 may be formed regardless of the photographing order.

In order to calculate location information, the sensing unit 140 includes at least one of an acceleration sensor, a magnetic sensor, a G-sensor, and a gyroscope sensor, thereby sensing a movement of the main body.

Also, the sensing unit 140 may include an inertial measurement unit (IMU) to sense an inclination of the main body. The IMU senses a rotation about three directional axes perpendicular to one another. The rotations about the Y-axis, X-axis, and Z-axis may be defined as a roll movement, a pitch movement, and a yaw movement, respectively. The IMU may measure angular speeds of the rotations about the three axes.

Meanwhile, the virtual view 210 may be changed into or expressed as a 2D processed image. In other words, the controller 180 may generate the processed image 220 by using a plurality of images having unique location information. The processed image 220 is composed of a plurality of images A to F arranged based on a central point 230. The arrangement of the plurality of images is determined by unique location information of the plurality of images.

In this case, the plurality of images may include areas overlapped based on the subject 200, and the processed image 220 may be expressed such that the plurality of images are overlapped. For example, if the user photographs the subject 200 while slowly moving, the plurality of images include areas overlapped with the subject 200. In this case, the controller 180 may generate the processed image 220 by using a technique of creating a panorama picture.

Hereinafter, a method of generating and outputting a processed image will be described in detail with reference to FIGS. 3 and 4A to 4D.

Figure 3:
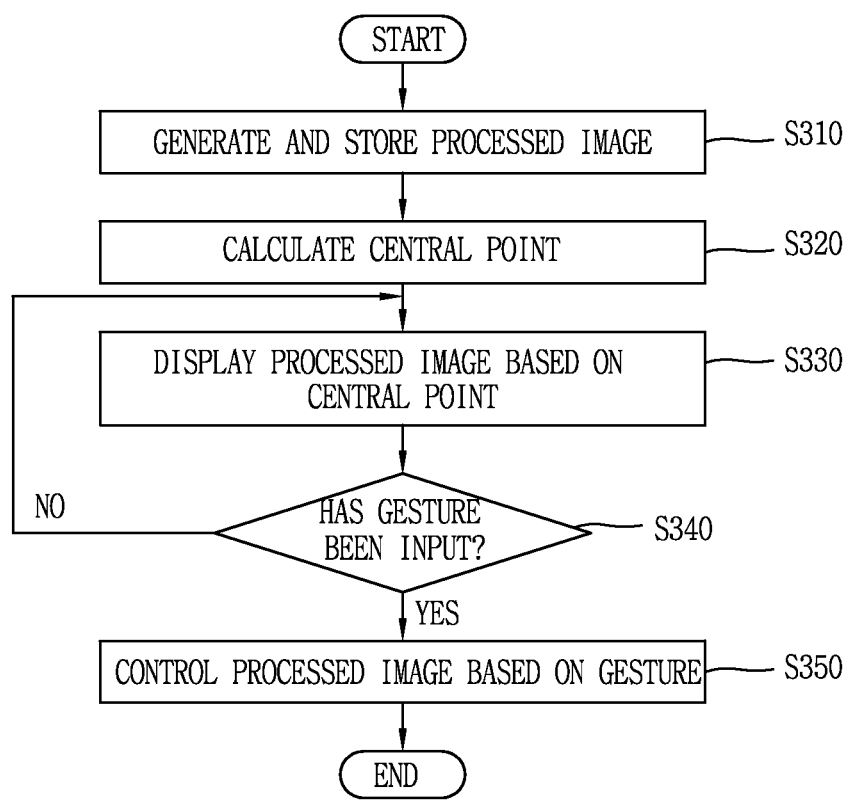
FIG. 3 is a flowchart illustrating a control method of generating and outputting a processed image.

FIG. 3 is a flowchart illustrating a control method of generating and outputting a processed image. FIGS. 4A to 4D are diagrams illustrating an example of continuously generating a plurality of images of a subject.

First, the controller 180 stores, in the memory 170, a plurality of images photographed by the camera 121 while the main body moves around a subject (S310). The camera 121 may correspond to the front camera 121a or rear camera 121b of the mobile terminal 100.

In this case, an image captured by the camera 121 may be output in real time on the touch screen 151. That is, as a preview image captured by the camera 121 is output on the touch screen 151, a user may identify an image to be photographed.

A plurality of graphic images receiving touch inputs for controlling functions of the camera 121 may be output on the preview image. For example, the touch screen 151 may include a photographing icon receiving a touch input for storing the preview image in the memory 170.

If a touch input is applied to the photographing icon, the controller 180 acquires a preview image when the touch input is applied, and stores the acquired preview image in the memory 170. The controller 180 may output, on the touch screen 151, a thumbnail icon corresponding to the stored preview image. After the preview image is stored, the controller 180 may continuously output the photographed image on the touch screen 151, or may again output a current preview image captured by the camera 121.

Meanwhile, the user may continuously photograph a subject while moving the mobile terminal 100 in a latitudinal direction and/or a longitudinal direction around the subject. As the main body generates a plurality of images while moving in the latitudinal direction and/or the longitudinal direction, the controller 180 calculates location information of each image by using a signal generated by the sensing unit 140, and stores, in the memory 170 (see FIG. 1), the generated images and location information corresponding thereto.

Here, an equator, a latitude, and a longitude refer to coordinate axes representing a virtual sphere having a virtual axis. The equator refers to an intersection line between a plane cut to perpendicularly pass the center of the sphere with respect to the virtual axis and the surface of the sphere. The latitude refers to a line drawn vertically parallel with respect to the equator. The longitude refers to a line drawn laterally parallel with respect to the virtual axis. For example, the virtual axis may be the rotation axis, and the virtual sphere may be the virtual view 201 described in FIG. 2B.

The movement in the latitudinal direction refers to a movement in the up/down direction around the subject, and the movement in the longitudinal direction refers to a movement in the left/right direction around the subject. The movement in the latitudinal and longitudinal directions refers to a movement in which the latitude and the longitude are simultaneously changed.

However, the coordinate axes are provided for convenience of description, and the mobile terminal according to the present disclosure is not necessarily limited to the coordinate axes. That is, the movement of the main body includes not only a case where the main body rotatably moves while the camera 121 and the subject maintain a predetermined distance but also a case where the main body straightly moves regardless of the distance between the camera 121 and the subject.

Next, the controller 180 calculates a central point of the photographed images (S320).

A central point is required such that a plurality of images forming a processed image are displayed to have perspectives on one touch screen 151. This is because the mobile terminal according to the present disclosure displays the plurality of images to move in up/down/left/right/front/rear directions based on the central point. Accordingly, the user can feel a perspective or spatial sense of a subject through a plurality of images of the subject.

The controller 180 calculates a virtual central point defined by a plurality of images, using location information included in the plurality of images.

Figure 4A:
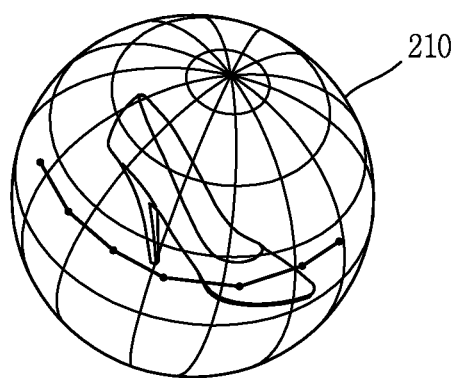
FIGS. 4A to 4D are diagrams illustrating an example of continuously generating a plurality of images of a subject.
Figure 4B:
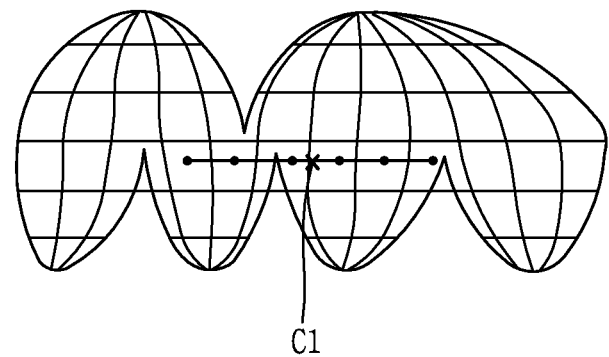
Figure 4C:
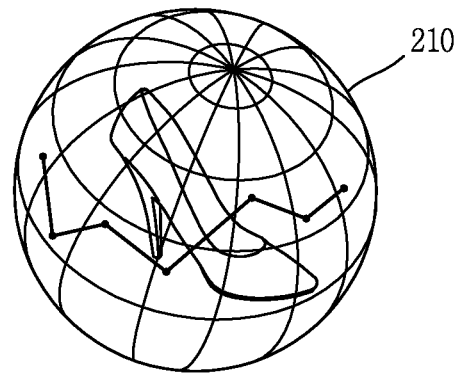
Figure 4D:
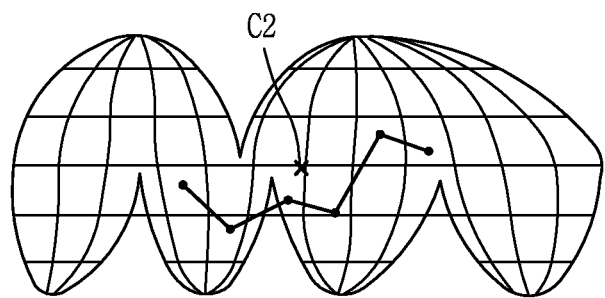

FIG. 4A illustrates an example in which a subject is photographed with a difference in longitude without any a change in latitude. If a plurality of images photographed in FIG. 4A are developed, the plurality of images are shown in FIG. 4B. On the other hand, FIG. 4C illustrates an example in which the latitude and the longitude are changed together. If a plurality of images photographed in FIG. 4C are developed, the plurality of images are shown in FIG. 4D. Thus, it can be seen that central points C1 and C2 of processed images are changed depending on the photographed images.

If a plurality of images of a subject are generated, as shown in FIG. 4B or 4D, a processed image in a form where a large number of still images corresponding to movements of the main body are spread may be formed. Specifically, the controller 180 may extract a minimum rectangle where the plurality of images are circumscribed, and set a central point of the extracted rectangle as a reference point for outputting the processed image.

Next, the controller 180 may display the processed image based on the central point (S330).

A processed image (or virtual image) is composed of a plurality of images of a subject, and the plurality of images are sequentially displayed based on a central point calculated by the plurality of images. Specifically, the controller 180 sequentially outputs, on the touch screen 151, the plurality of images included in the processed image, based on the calculated central point.

Here, 'a processed image is displayed' or 'a processed image is output' means that any one of a plurality of images constituting the processed image is displayed on the touch screen 151. That is, a processed image is composed of a plurality of images obtained by photographing a subject at various angles. In this case, any one image photographed at a specific angle among the plurality of images is output as the processed image.

The plurality of images constituting the processed image are images obtained by photographing the subject at various angles, and each image includes relative or absolute location information on the subject. Since the plurality of images are sequentially displayed based on the central point, the user can feel a perspective or spatial sense of the subject.

The processed image is distinguished from a panorama image output as one image by synthesizing a plurality of images.

For example, when the plurality of images shown in FIG. 4B, the plurality of images may be sequentially output from the image located at the leftmost side to the image located at the rightmost side based on the central point C1. That is, when the user photographs a plurality of images are photographed by rotating by 360 degrees with only a different in longitude without any change in latitude, the plurality of images are output in an order where the main body moves in the right or left direction from one surface of the subject. The user feels as if the user views the subject while moving step by step in the right or left direction in front of the subject. Also, the user feels a perspective or spatial sense of the subject. That is, the user visually identifies a change in photographing angle according to the movement of the main body.

The order where the plurality of images are output based on the central point may be variously modified according to exemplary embodiments. For example, the plurality of images may be output, based on the central point, in the right direction from the left direction, in the left direction from the right direction, in the down direction from the up direction, or in the up direction from the down direction.

Also, the order where the plurality of images are output based on the central point may be varied by a gesture applied from the user. When a gesture is input in the state in which the processed image is output (S340), the controller 180 controls the processed image based on the input gesture (S350).

When a processed image is displayed on the touch screen 151, any one image among a plurality of images constituting the processed image is output. In this state, if a gesture is input, the controller 180 does not output the one image but outputs another image according to the input gesture. Specifically, when a movement of the main body is sensed while the processed image is output, the controller 180 controls the touch screen 151 such that an image corresponding to the movement of the main body based on the central point among the plurality of images constituting the processed image is output.

The gesture may correspond to any one of functions 'up/down/left/right/front/rear'. The up/down/left/right/front/rear refers to a visual field facing a subject in view of an observer observing the subject, i.e., a direction in which the camera faces.

Figure 5A:
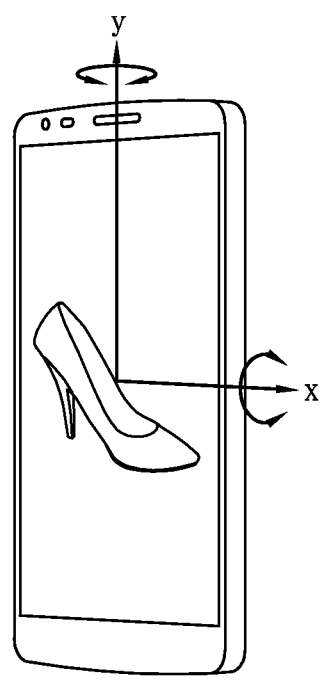
FIGS. 5A and 5B are diagrams illustrating a method of controlling an output of a processed image based on a user's gesture.
Figure 5A:
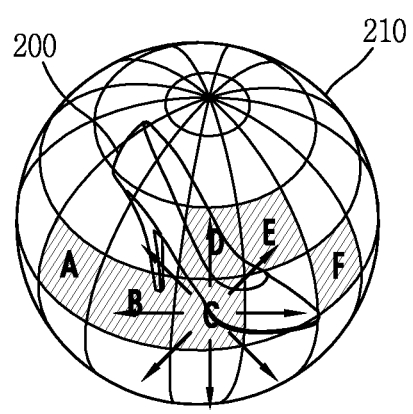

As an example, if a gesture corresponding to the 'up' is input, an image obtained by photographing the subject at a location higher than a currently output image is output. Referring to FIG. 5A, if a gesture corresponding to the 'up' is input while the image C is output, image D is output instead of the image C. That is, if the gesture corresponding to the 'up' is input, there occurs an effect as if the visual field is raised upward in view of an observer observing the subject.

As another example, if a gesture corresponding to the 'front' is input, the currently output image is enlarged and displayed. That is, if the gesture corresponding to the 'front' is input, the subject is enlarged and displayed as if the camera approaches the subject. On the contrary, if a gesture corresponding to the 'rear' is input, the controller 180 reduces and outputs the current output image.

The gesture may be input in various manners.

For example, as shown in FIG. 5A, when the main body rotates based on a virtual axis, a processed image may be controlled according to the rotating direction and rotating angle of the main body. Specifically, the direction in which the camera faces is changed depending on the rotating direction of the main body, and the degree where the camera moves is changed depending on the rotating angle of the main body. When the main body rotates to the right side based on the Y-axis, the controller 180 may move a current output image in the right direction based on the central point. That is, when the main body rotates to the right side based on the Y-axis in the state of the image C is output, image E or F may be output. On the contrary, when the main body rotates to the left side based on the Y-axis, image B may be output instead of the image C.

In this case, the speed where images are sequentially output or the amount where images are sequentially output may be changed depending on a degree where the main body rotates. For example, when the main body rotates to the left side within a first reference angle based on the Y-axis, the image B may be output instead of the image C. When the main body rotates at an angle greater than the first reference angle, image A may be output instead of the image C. When the image A is output instead of the image C, the images C, B, and A may be sequentially output.

Meanwhile, when a movement of the main body is sensed while any one of the plurality of images included in the processed image, the controller 180 may sequentially output images in an order corresponding to the movement of the main body based on the central point among the plurality of images. For example, when the main body rotates to the right side based on the Y-axis while the image A is output, the controller 180 may sequentially output images B to F, instead of the image A.

Figure 5B:
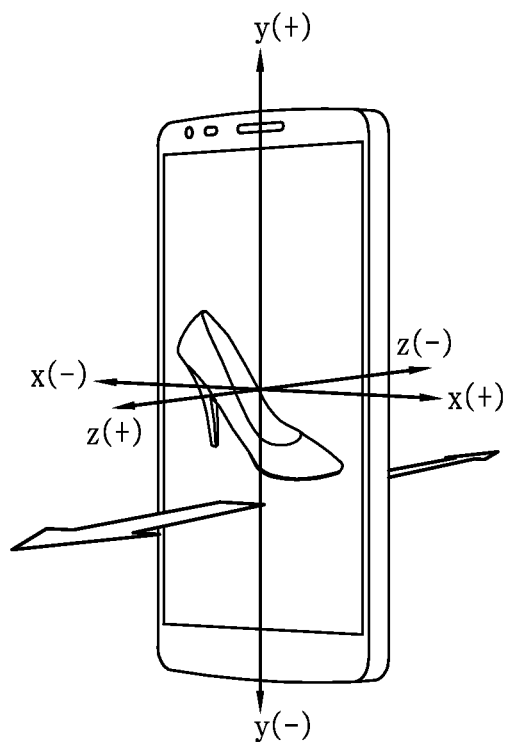
Figure 5B:
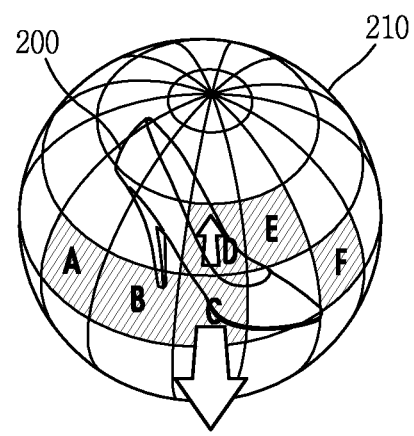

As shown in FIG. 5B, when the main body moves along a virtual axis, the processed image may be controlled according to the moving direction and moving distance of the main body. For example, when the main body moves in a (+)/(−) direction of the Z-axis, the controller 180 may enlarge/reduce a currently output image. In this case, the enlarged or reduced rate is changed depending on the moving distance of the main body. When the main body moves in a (+)/(−) direction of the Y-axis, the controller 180 may move the currently output image in the up/down direction based on the central point. When the main body moves in a (+)/(−) direction of the X-axis, the controller 180 may move the currently output image in the left/right direction based on the central point.

When the movement of the main body satisfies a predetermined condition, the controller 180 may stop sequentially outputting a plurality of images and output any one image among the plurality of images. That is, control as if the reproduction of a moving picture is temporarily stopped may be performed.

Here, the predetermined condition means that the movement of the main body returns to a state before the movement of the main body is started. For example, when the main body rotates to the right side based on the Y-axis in a first state to move to a second state, the images B to F are sequentially output instead of the image A. When the main body again moves from the second state to the first state while the image C is output, the image C is continuously output as if the sequential reproduction is temporarily stopped.

Although not shown in these figures, at least one of the functions 'up/down/left/right/front/rear' may be performed by a touch input such as a drag input. For example, when a touch input continuously moving from a first point to a second point is received, the controller 180 may output another image instead of any one image among the plurality of images, based on the direction facing the second point from the first point. When the touch input is not released at the second point but maintained, images in an order corresponding to the touch input may be sequentially output. Subsequently, when the touch input is released, the controller 180 stops sequentially outputting the plurality of images and outputs any one image among the plurality of images.

As described above, the mobile terminal according to the present disclosure can display a plurality of images of a subject to have a perspective, and control the plurality of images in connection with a user's gesture. Accordingly, the mobile terminal can provide stereoscopic displays, and mutually display the stereoscopic displays with the user.

Meanwhile, a process of photographing a processed image and a process of outputting the photographed processed image may be discontinuously performed. Hereinafter, the process of photographing a processed image and the process of outputting the photographed processed image will be described in detail through exemplary embodiments.

First, the process of photographing a processed image will be described in detail.

The mobile terminal according to the present disclosure may provide a processed image photographing mode for photographing a processed image. The processed image photographing mode may be any one of a plurality of photographing modes provided by the mobile terminal A user may touch a menu or icon related to the execution of the processed image photographing mode, thereby executing the processed image photographing mode.

Further, if a predetermined condition is satisfied even though a direct control command is not applied from the user, the mobile terminal according to the present disclosure may automatically execute the processed image photographing mode. That is, the mobile terminal may automatically enter into the processed image photographing mode.

Figure 6A:
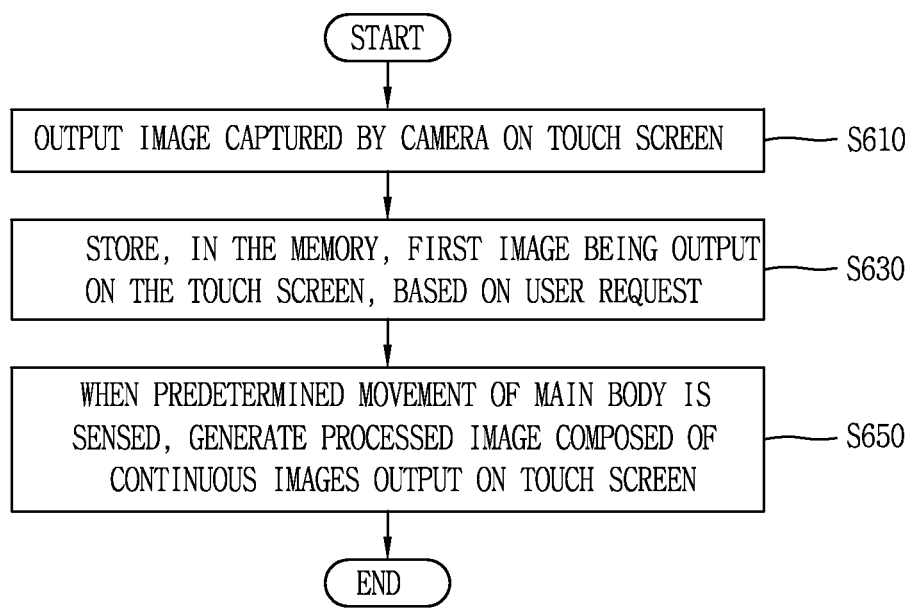
FIG. 6A is a flowchart illustrating a control method of the mobile terminal which automatically enters into a processed image photographing mode.
Figure 6B:
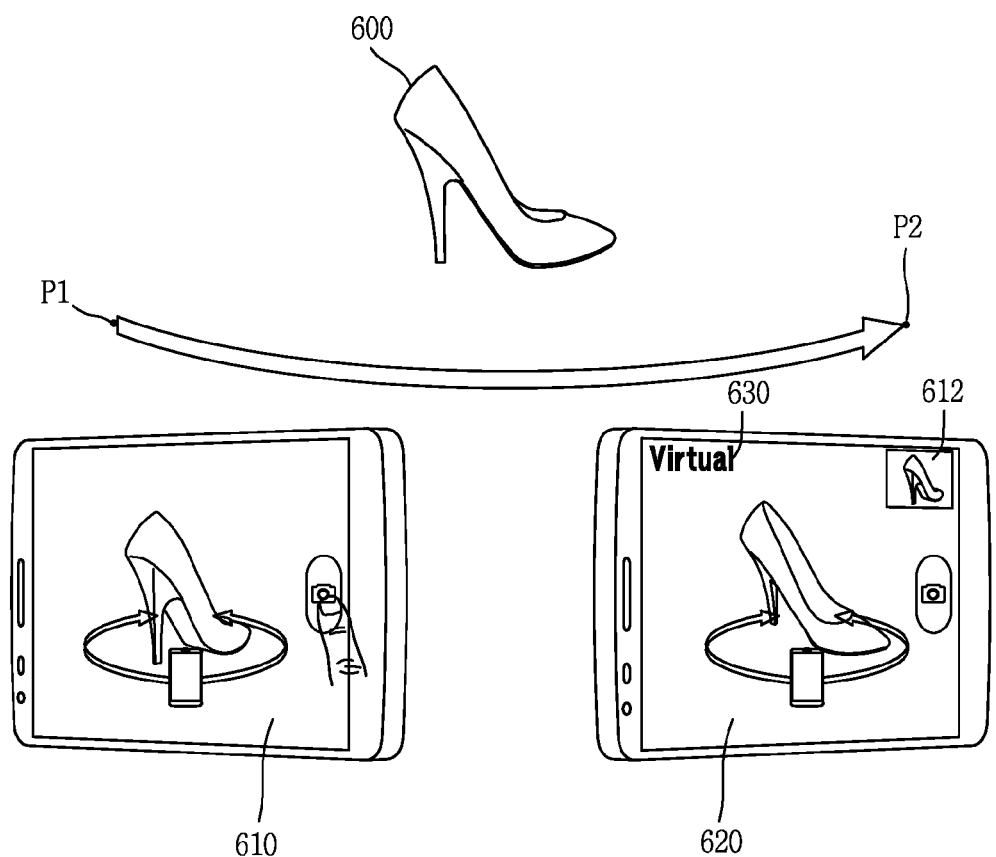
FIG. 6B is a conceptual diagram illustrating the control method of FIG. 6A.

FIG. 6A is a flowchart illustrating a control method of the mobile terminal which automatically enters into the processed image photographing mode. FIG. 6B is a conceptual diagram illustrating the control method of FIG. 6A.

Referring to FIGS. 6A and 6B, the controller 180 controls an image of an external environment to be captured by the camera 121 provided in the main body, and outputs the captured image on the touch screen 151 (S610). The camera 121 may correspond to the front camera 121a or the rear camera 121b. The photographed image is output in real time on the touch screen 151. That is, as the touch screen 151 outputs a preview image captured by the camera 121, a user may identify an image to be photographed.

Next, the controller 180 stores, in the memory 170, a first image being output on the touch screen 151, based on a user request (S630). For example, a photographing icon may be displayed on the preview image, and the first image may be photographed in response to a touch input applied to the photographing icon. If the first image is stored in the memory 170, the controller 180 may output the first image on the touch screen 151, or may again output a preview image currently captured by the camera 121. In addition, the controller 180 may output a thumbnail image corresponding to the first image on the preview image.

Meanwhile, the sensing unit 140 may sense a movement of the main body while the preview image is output. Also, the controller 180 may sense a movement of the main body by using a signal generated by the sensing unit 140.

When a predetermined movement of the main body is sensed, the controller 180 generates a processed image composed of continuous images output on the touch screen 151 (S650).

In this case, the predetermined movement of the main body is to be sensed within a predetermined time from the point of time when the user request is received. The processed image is generated only when the predetermined movement of the main body is to be sensed within the predetermined time from the point of time when the first image is generated. That is, when the predetermined movement of the main body is sensed after the predetermined time elapses, the processed image is not generated. This is provided for the purpose of preventing a processed image from being generated against a user's intention.

Meanwhile, the controller 180 tracks a virtual trace formed as the main body moves by using the signal generated by the sensing unit 140, and determines whether the virtual trace corresponds to the predetermined movement of the main body. As an example, the predetermined movement of the main body may be a movement in which the main body moves around a subject included in the first image. As another example, the predetermined movement of the main body may mean a case where the moving path of the main body creates a relatively regular curve or a case where the movement of the main body is constant as time elapses.

Further, when the main body photographs two or more still images of the same subject while moving around the same subject, the controller 180 may also generate the processed image.

Meanwhile, when the processed image is generated, the controller 180 controls the memory 170 to continuously store images captured by the camera 121 while the main body moves. For example, the controller 180 may store the images at a predetermined time interval while the main body moves. In this case, the time interval may be constant, or may be changed depending on a speed at which the main body moves or rotates.

The controller 180 generates the processed image by using the plurality of images stored while the main body moves and information on the movement of the main body. The controller 180 may store a plurality of continuous images together with location information on a relative movement of the main body and/or location information representing an absolute location of the main body, and list the plurality of images based on the location information, thereby forming the processed image.

According to the present disclosure, although a separate control command for generating the processed image is not applied, a user's intention is detected based on the movement of the main body, and the processed image is generated based on the movement of the main body. Also, it is unnecessary for the user to separately change the photographing mode, and it is possible to provide the user with a processed image where the user can feel a perspective of a subject.

Meanwhile, the controller 180 may generate the processed image in a background. Specifically, the controller 180 may output a preview image captured by the camera 121 in a foreground, and store continuous images captured by the camera (or output on the touch screen 151) in a background. The controller 180 may generate the processed image by using continuously stored images.

For example, as shown in FIG. 6B, when a photographing command is applied from the user at a first location P1 around a subject 600, the controller 180 photographs a first image 610. The photographed first image may be output as a thumbnail image 612 on a preview image. Subsequently, if a movement of the main body moving around the subject 600 is sensed within a predetermined time from the point of time when the photographing command is applied, the controller 180 generates the processed image in the background.

The user may move to the first location P1 in a state in which the preview image is output (or a state in which the camera is turned on) and stop the movement at a second location P2. When the subject 600 is included in a second image 620 being output on the touch screen 151 at the point of time when the movement of the main body is ended, the controller 180 controls the touch screen 151 to output guidance information 630 for guiding that the processed image is being generated. Accordingly, the user can recognize that the processed image is being automatically generated under control of the controller 180, and determine whether the processed image is to be continuously photographed.

Meanwhile, the controller 180 may temporarily stop or end the generation of the processed image according to the movement of the main body. For example, when the movement of the main body is ended, the controller 180 temporarily stops the generation of the processed image. This is provided for the purpose of preventing resources of the mobile terminal from being unnecessarily wasted. Subsequently, if a new movement of the main body is sensed, the controller 180 again generates the processed image of which generation is temporarily stopped. On the other hand, when assuming that the movement of the main body is a movement in which the main body moves in a first direction around the subject, the controller 180 ends the generation of the processed image when a movement changed to a second direction different from the first direction is sensed. The second direction may be a direction opposite to the first direction.

Although not shown in these figures, when a movement of the main body moving in the left/right or up/down direction around a subject included in a preview image is sensed in the state in which the preview image is output, the controller 180 may output a processed image photographing icon related to a function of generating a processed image. If a touch input is applied to the processed image photographing icon, the controller 180 may start the generation of the processed image. Since the processed image photographing icon is automatically provided, the user can immediately perform the function of generating the processed image.

Meanwhile, when a processed image is generated, the mobile terminal according to the present disclosure may output, on the preview image, an indicator corresponding to the processed image.

Meanwhile, in the control method of the mobile terminal according to the present disclosure, the storing of the first image in the memory based on the user request (S630) may be omitted. In other words, if a predetermined movement of the main body is sensed while the image captured by the camera is being output on the touch screen (S610), the controller 180 may generate a processed image composed of continuous images (S650). Although any user request is not input, the mobile terminal may automatically generate a processed image based on the predetermined movement of the main body.

Specifically, the controller 180 controls the touch screen 151 to output a first image received from the camera, and controls the memory 170 to temporarily store the first image.

The first image may be composed of a plurality of frames. In this case, the controller 180 may store frames received from the camera in the memory for a reference time. For example, if n frames are photographed for a reference time t, a first frame is deleted when an (n+1)th frame is stored, and a second frame is deleted when an (n+2)th frame is stored. In other words, frames photographed within the reference time based on a current point of time are temporarily stored in the memory 170.

If a movement of the main body, which satisfies a predetermined condition, is sensed while the first image is being temporarily stored, the controller 180 generates a processed image.

The predetermined condition means that a movement rotating by a reference angle or more from the point at which the first image is sensed based on a virtual axis around a subject included in the first image. For example, when the main body of the terminal rotates by an angle greater than 10 degrees from a point at which the first image is photographed around the subject included in the first image, the controller 180 may generate a processed image.

The processed image includes at least one portion of the first image temporarily stored in the memory and continuous images sequentially received from the camera after the first image is photographed.

If a movement of the main body does not satisfy the predetermined condition, the controller 180 continues to store the first image received from the camera temporarily. In this case, the processed image is not generated.

If the generation of the processed image is ended, one file corresponding to the processed image is stored in the memory 170.

Figure 7A:
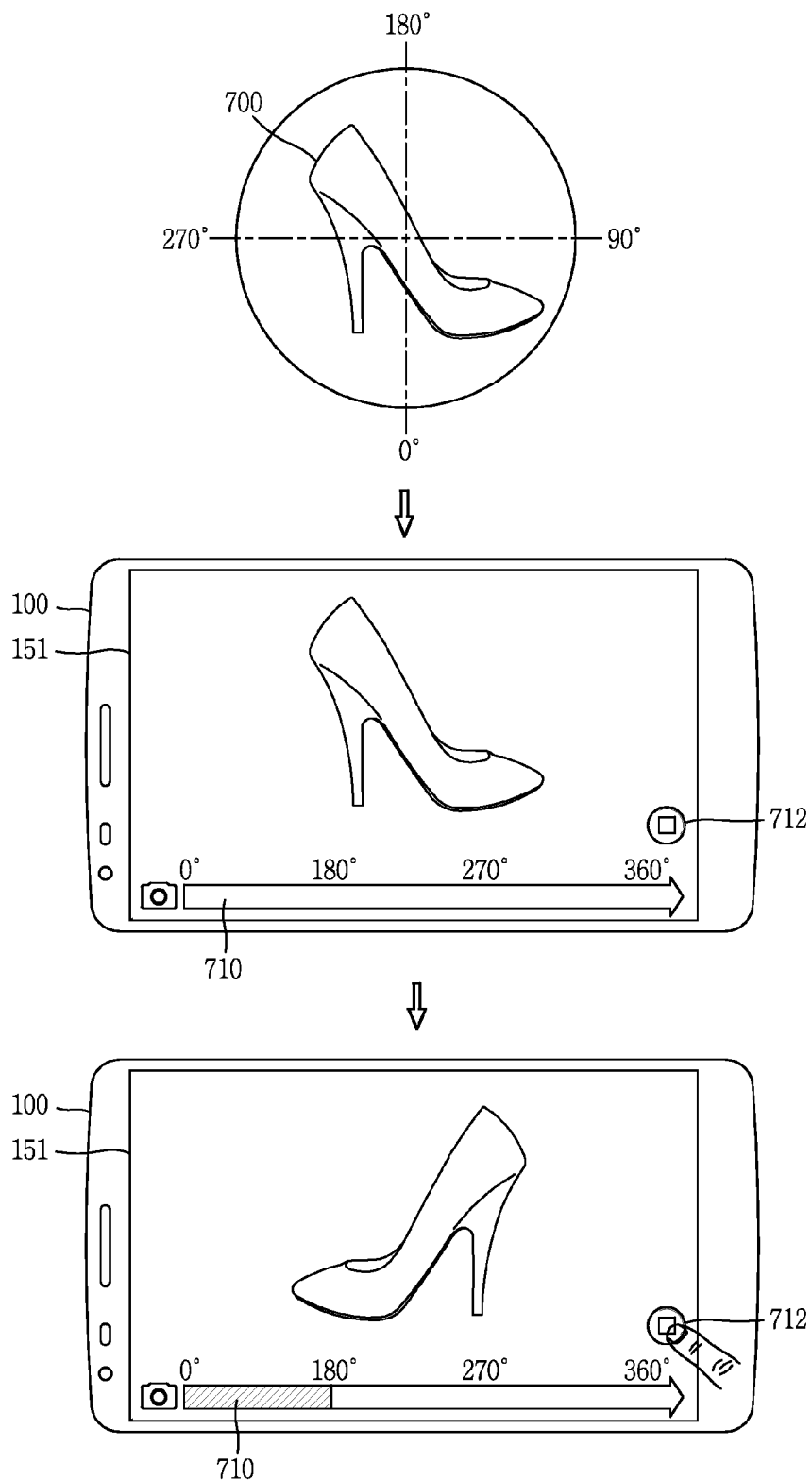
FIGS. 7A to 7C are diagrams illustrating a method of providing an indicator when a plurality of images are continuously generated.
Figure 7B:
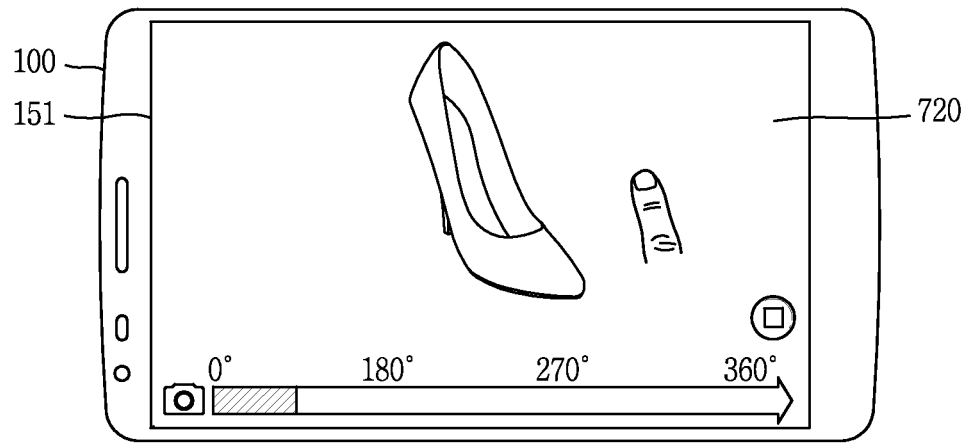
Figure 7B:
Figure 7B:
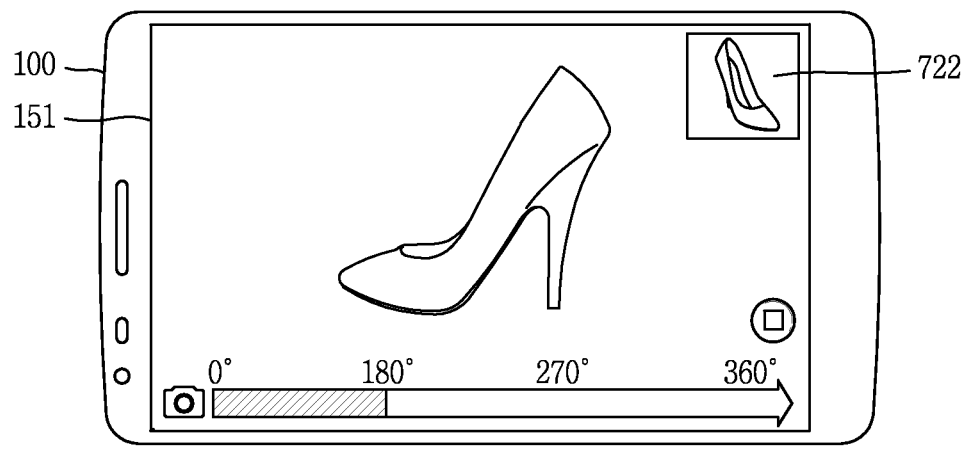
Figure 7C:
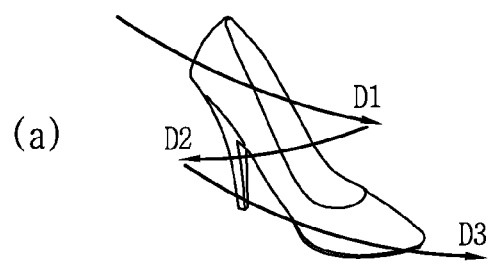
Figure 7C:
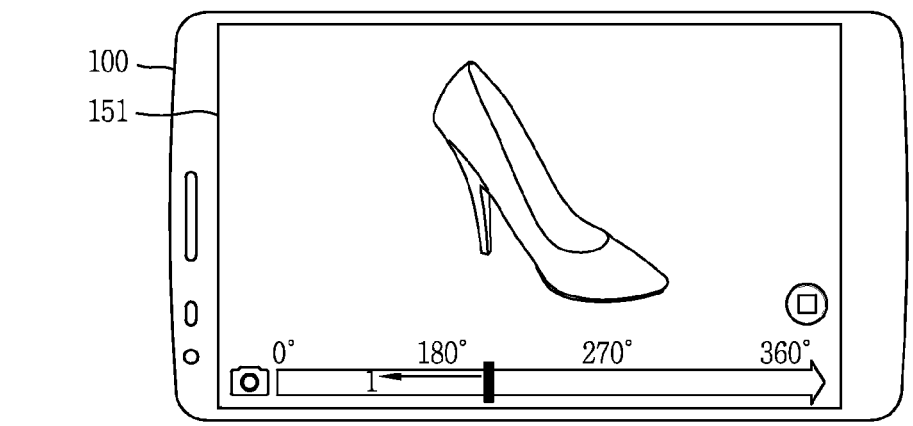
Figure 7C:
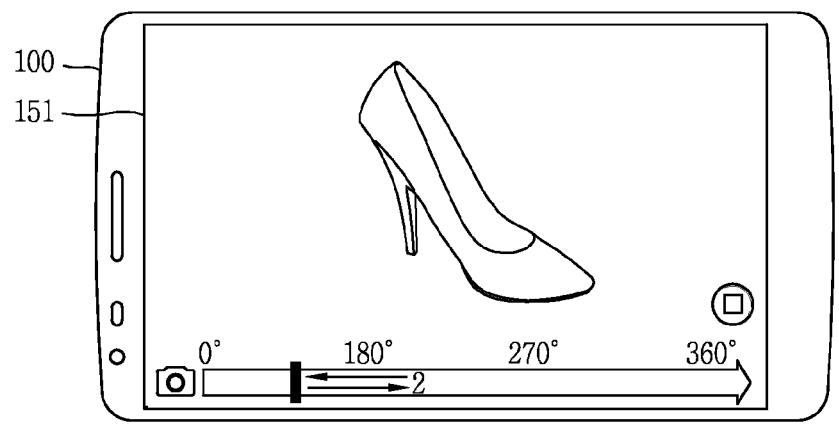

FIGS. 7A to 7C are diagrams illustrating a method of providing an indicator when a plurality of images are continuously generated.

Referring to FIG. 7A, as a processed image is generated, the controller 180 may output, on the preview image, an indicator corresponding to the processed image.

Specifically, the controller 180 sets a virtual photographing area around a subject included in the preview image, and divides the virtual photographing area into an area in which the photographing is made based on the movement of the main body and an area in which the photographing is not made. The indicator is configured to guide at least one of the area in which the photographing is made and the area in which the photographing is not made. Further, the indicator may be configured to guide the movement of the main body to the area in which the photographing is not made, so that the subject is photographed at various angles.

The virtual photographing area may be defined by a photographing angle. The photographing angle refers to an angle at which the camera and a virtual axis are formed based on the virtual axis formed by the subject. The virtual axis may be calculated by an initial image obtained by initially photographing the subject. Specifically, the controller 180 may set, as the virtual axis, a straight line connecting the camera and the subject when the initial image is photographed, and calculate photographing angles of a plurality of images based on the virtual axis.

For example, if an initial image of a subject 700 is photographed, as shown in FIG. 7A, a virtual photographing area is set around the subject 700. The photographing area ranges from 0 degree to 360 degrees, and the 0 degree (or the 360 degrees) is located on a straight line connecting the location at which the initial image is photographed and the subject. If the photographing of a processed image is started, the controller 180 outputs an indicator 710 configured to guide at least one of an area in which the photographing is made and an area in which the photographing is not made.

As the photographing of the processed image is made, the area in which the photographing is made and the area in which the photographing is not made are varied.

The controller 180 may output, on the preview image, a graphic object 712 capable of temporarily stopping or ending the generation of the processed image. The user applies a touch input to the graphic object 712, so that the generation of the processed image can be temporarily stopped or ended.

When the generation of the processed image is temporarily stopped or ended, the controller 180 stores the processed image in the memory 170. In addition, the controller 180 stores information on at least one of the area in which the photographing is made and the area in which the photographing is not made, together with the processed image.

Meanwhile, referring to FIG. 7B, a photographing command may be applied from the user while the processed image is generated. In this case, the controller 180 may photograph an image captured by the camera separately from the generation of the processed image, and generate a still image. For example, when a touch input is applied to the touch screen 151 while the processed image is generated, the controller 180 may store a third image 720 being output on the touch screen 151, independently from the processed image. In addition, the controller 180 may display an independently stored thumbnail 722 of the third image on the preview image.

Accordingly, while a processed image is photographed at various angles to have a perspective, a still image can be photographed together with the processed image. When an important portion is detected from a subject while the processed image is photographed, the user can keep a record of the corresponding portion by using a still image.

Meanwhile, the mobile terminal according to the present disclosure can continuously photograph a processed image even when the photographing direction in the photographing of the processed image is changed.

Referring to (a) of FIG. 7C, while the user is photographing a processed image while moving in a first direction D1 around the subject 700, the user may desire to again photograph a portion of the subject 700. That is, the user may desire to repeatedly photograph a previously photographed portion. In this case, while the user is photographing the processed image while moving in the first direction D1, the photographing direction of the processed image may be changed to a second direction D2. In addition, the photographing direction may be again changed from the second direction D2 to a third direction D3.

The controller 180 may sense the photographing direction based on at least one of the movement of the main body and GPS information, and output photographing direction information for guiding the photographing direction together with the indicator.

The photographing direction information may include at least one of a photographing angle at which a direction change occurs, a direction in which the photographing is being made, a direction in which the photographing was made, a number of times where the photographing direction is changed, and an order in which the photographing direction is changed.

For example, as shown in (b) of FIG. 7C, when the photographing direction information is not output while the user moves in the first direction D1, and the photographing direction is then changed to the second direction D2, the photographing direction information may be output to guide that a first direction change has been made.

In this case, information on the first direction in which the photographing was previously made and information on the second direction in which the photographing is currently made may be included in the photographing direction information. The information on the second direction may guide a photographing angle of a point at which a direction change to the second direction is made in the virtual photographing area. For example, as shown in (b) of FIG. 7C, when the direction change is made at a point at which the photographing angle of the subject is 220 degrees, the information on the second direction may be output at a point corresponding to the 220 degrees in the entire area of the indicator.

Subsequently, when the photographing direction is changed to the third direction D3, the controller 180 may allow information related to a second direction change to be further included in the photographing direction information. Since both information related to the first direction change and information related to the second direction change are included in the photographing direction information, the user can identify, at a glance, a change in the photographing direction when the processed image is generated.

Figure 8A:
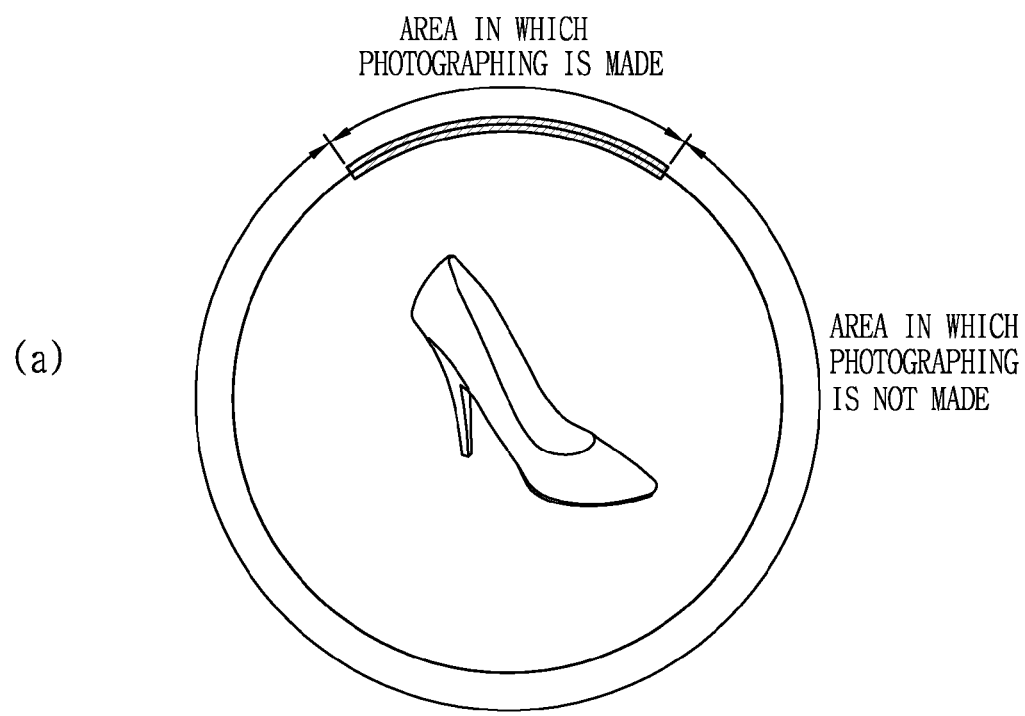
FIGS. 8A to 8C are diagrams illustrating a method of photographing a new processed image subsequently to a processed image which was previously photographed.
Figure 8A:
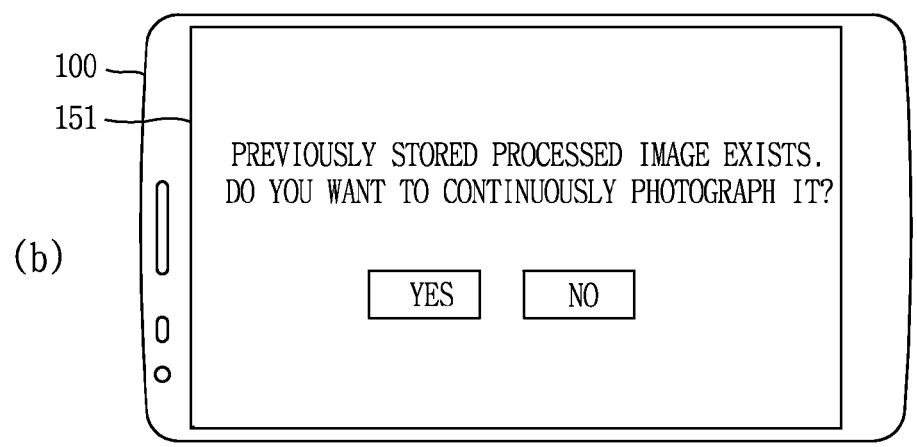
Figure 8B:
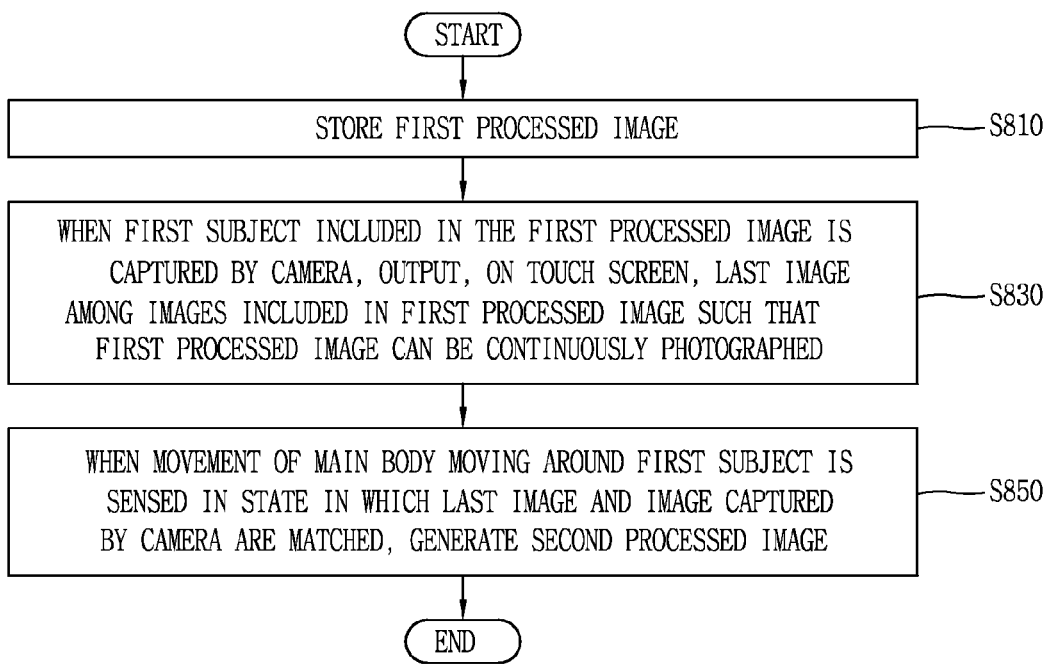
Figure 8C:
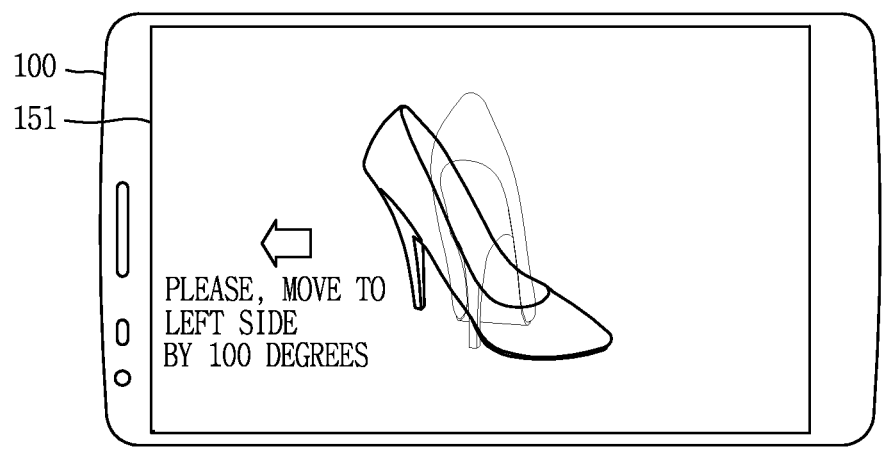

FIGS. 8A to 8C are diagrams illustrating a method of photographing a new processed image subsequently to a processed image which was previously photographed.

As shown in (a) of FIG. 8A, when the photographing of a processed image is temporarily stopped or ended, the processed image is stored in the memory 170. In this state, the processed image includes information on an area in which the photographing is made and an area in which the photographing is not made.

When the camera 121 is activated such that a preview image captured by the camera 121 is output on the touch screen 151 in a state in which at least one processed image is stored in the memory 170, the controller 180 searches a processed image including a subject included in the preview image.

When the searched processed image has an area in which the photographing is not made, as shown in (b) of FIG. 8A, the controller 180 may output, on the touch screen, the last image among images included in the searched processed image such that the searched processed image can be continuously photographed. In this case, the preview image and the last image may be displayed to overlap each other.

As shown in FIG. 8B, a first processed image is first stored (S810) in order for the processed image to be continuously photographed. The first processed image may be a processed image received from an external terminal or server or a processed image photographed by the camera provided in the main body.

Next, when a first subject included in the first processed image is captured by the camera, the controller 180 outputs, on the touch screen, the last image among images included in the first processed image such that the first processed image can be continuously photographed (S830). Here, the last image refers to an image lastly photographed among a plurality of images constituting the processed image.

The last image is displayed to overlap the image captured by the camera. To this end, the controller 180 may adjust the transparency of at least one of the last image and the image captured by the camera.

As shown in FIG. 8C, the controller 180 may calculate at least one of a direction in which the main body is to move, a distance at which the main body is to move, and an angle such that the last image and the image captured by the camera are matched, and provide the calculated information to the user. The calculated information may be output in at least one of a visual manner, an auditory manner, and a tactile manner.

Accordingly, the user can move the mobile terminal such that the last image and the image captured by the camera are matched.

Next, when a movement of the main body moving around the first subject is sensed in the state in which the last image and the image captured by the camera are matched, the controller 180 generates a second processed image (S850). The second processed image is photographed subsequently to the first processed image. The controller 180 may generate the second processed image by using the first processed image, and store, in the memory 170, the second processed image independently from the first processed image.

Meanwhile, when a processed image having no area in which the photographing is not made is searched (or when a processed image obtained by photographing all areas of a subject), the controller 180 may guide that it is unnecessary to photograph any processed image. On the other hand, when any processed image is not searched, the controller 180 controls the touch screen 151 to output the preview image.

Accordingly, it is possible to previously prevent the same subject from being repeatedly photographed, and the memory 170 can be efficiently used. Also, the user can thoroughly photograph a subject such that there is no area in which the photographing is not made.

As described above, the mobile terminal according to the present disclosure may generate a processed image by photographing continuous images without any specific control command. Further, the mobile terminal according to the present disclosure may execute a processed image photographing mode for generating a processed image in response to a user request. For example, an icon related to the execution of a processed image photographing mode is included in a home screen page, and if a touch input is applied to the icon, the controller may execute the processed image photographing mode. The user request for executing the processed image photographing mode may be variously modified.

Figure 9:
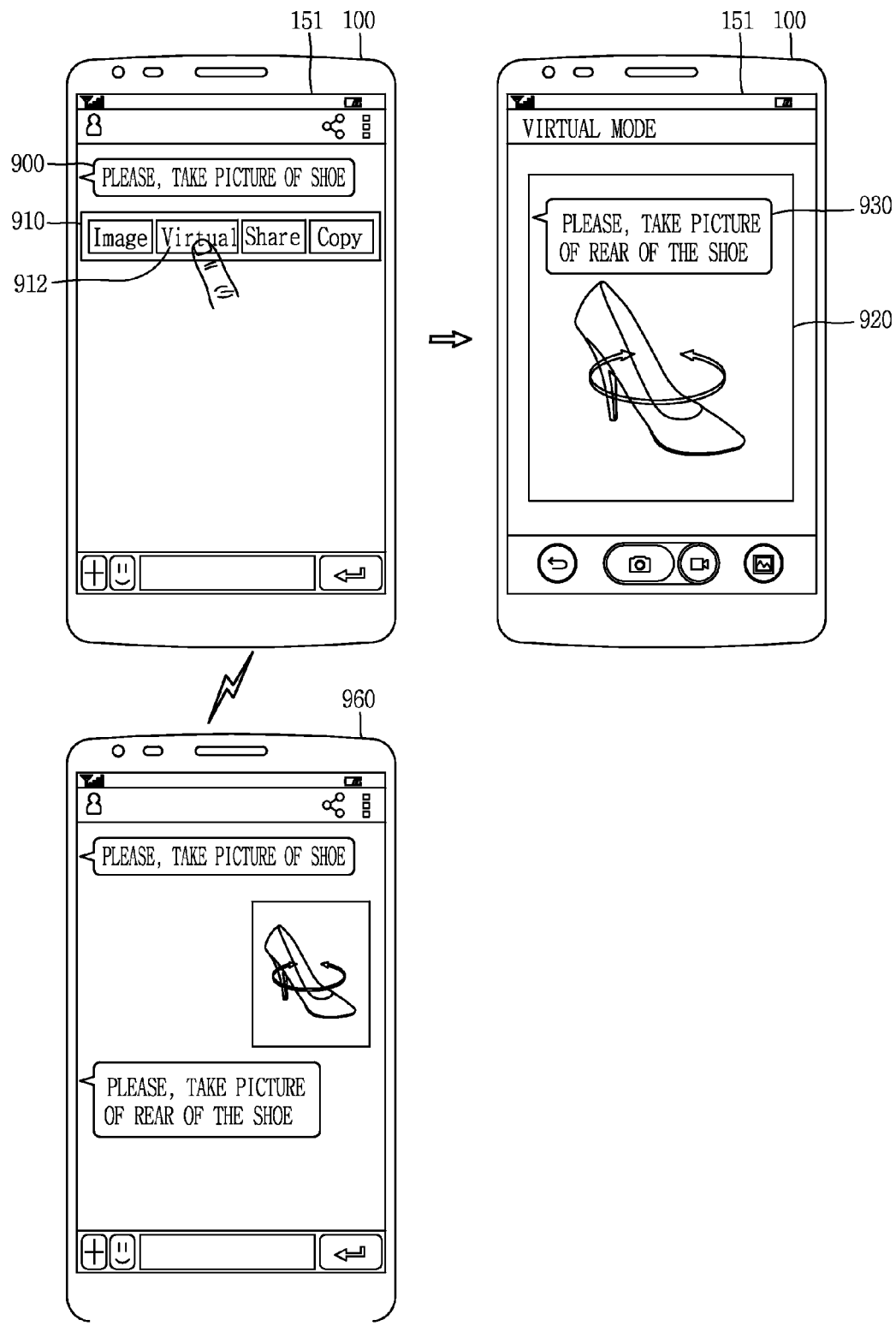
FIG. 9 is a diagram illustrating an exemplary embodiment in which the mobile terminal enters into the processed image photographing mode.

FIG. 9 is a diagram illustrating an exemplary embodiment in which the mobile terminal enters into the processed image photographing mode.

A user may transmit/receive messages to/from a companion by using a message application. An execution screen of the message application is displayed on the touch screen 151, and transmitted/received messages are displayed on the execution screen.

The controller 180 may determine whether the processed image photographing mode is executed by detecting contents of the transmitted/received messages. More specifically, when a message of requesting the user to photograph a specific object is received from the companion, the controller 180 may execute the processed image photographing mode, or may output an icon related to the execution of the processed image photographing mode.

As an example, a message "Please, take a picture of a shoe" is received from the component, the controller 180 may control the touch screen 151 to output an icon 912 related to the processed image photographing mode on the execution screen of the message application. As another example, if a touch input is applied to the message "Please take a picture of a shoe" while the message received from the companion is output, menus 910 related to the message are output. In this case, a menu related to the processed image photographing mode may be included in the menus 910. The user applies a touch input to the icon 912 or the menu related to the processed image photographing mode, thereby executing the processed image photographing mode.

When the processed image photographing mode is executed by the message received from the companion, the controller 180 controls the touch screen 151 to output an image 920 captured by the camera instead of the execution screen of the message application. If a new message 930 is received from a companion terminal 960 while the image 920 captured by the camera is output, the controller 180 controls the touch screen 151 to output the new message 930 on the image 920 captured by the camera.

For example, if a message "Please, take a picture of a rear of the shoe in detail" is received from the companion while a processed image is being generated, the controller 180 controls the touch screen 151 to output the message received together with the processed image being generated. Accordingly, the user can accurately photograph a specific part of a subject, which the companion intends to identify, while identifying the message received from the companion.

Unlike as shown in this figure, when the processed image photographing mode is executed by the message received from the companion, the execution screen of the message application and the image 920 captured by the camera may be output in different areas of the touch screen 151.

Meanwhile, the controller 180 may transmit, in real time, the generated processed image to the companion terminal 960. If the processed image is received while the execution screen of the message application is being displayed, the companion terminal 960 may output the received processed image at a portion of the execution screen.

FIGS. 10A to 10E are diagrams illustrating a method of guiding a photographing attribute when a processed image is output.

Figure 10A:
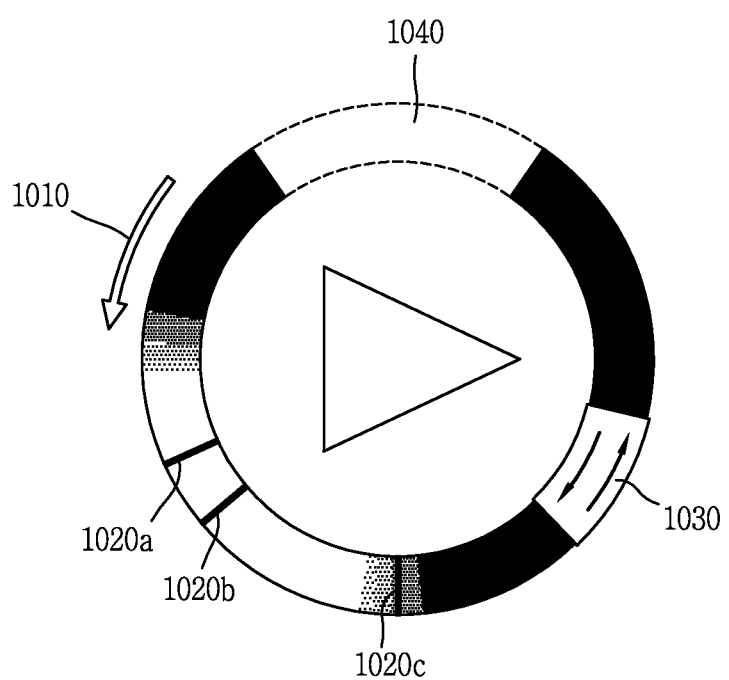
FIGS. 10A to 10E are diagrams illustrating a method of guiding a photographing attribute when a processed image is output.

When a processed image is output, the mobile terminal according to the present disclosure may output a graphic object for guiding a photographing attribute acquired in photographing of the processed image. For example, as shown in FIG. 10A, the graphic object represents a virtual photographing area set around a subject. The virtual photographing area is divided into an area in which the photographing is made based on a movement of the main body and an area in which the photographing is not made. The graphic object is configured to guide at least one of the area in which the photographing is made and the area in which the photographing is not made.

Since the photographing area is defined based on a photographing angle, a user can identify, at a glance, which area has been photographed around the subject, and selectively reproduce a portion which the user intends to first view at the angle where the photographing area is defined. Specifically, if a touch input is applied to one point of the graphic object, the controller 180 calculates a photographing angle corresponding to the point to which the touch input is applied, and controls the touch screen 151 to output an image photographed at the calculated photographing angle.

The graphic object may be configured to guide a photographing speed for each section. As an example, after an average photographing speed of all photographing sections is calculated, a section having a photographing speed faster than the calculated average photographing speed may be displayed with a dark color, and a section having a photographing speed slower than the calculated average photographing speed may be displayed with a light color. As another example, the corresponding photographing speed for each section may be guided in the form of a text. Accordingly, the user can intuitively recognize the photographing speed.

The photographing speed refers to a speed at which the main body moves.

The controller 180 generates a processed image by using a plurality of images having unique location information. In this case, the controller 180 photographs an image at every unit time and generates a processed image by using the plurality of photographed images. As the photographing speed at a predetermined photographing angle increases, the number of images photographed at the predetermined angle decreases. For example, when the photographing is made at a first photographing speed with respect to a section of 90 degrees to 180 degrees, n images are generated. However, when the photographing is made at a second photographing speed faster than the first photographing speed, m images (m is smaller than n) are generated. As the photographing speed becomes slower, a larger number of images are photographed, and hence a processed image may be generated in which the movement of a subject becomes more natural as the photographing speed becomes slower.

On the other hand, the reproduction speed refers to a speed at which a plurality of images included in a processed image are output on the touch screen 151.

For example, a first processed image may be generated in which the photographing is made at the first photographing speed with respect to a section of 0 degree to 180 degrees, and the photographing is made at the second photographing speed with respect to a section of 180 degrees to 360 degrees. When the first processed image is reproduced, the reproduction is made at a predetermined reproduction speed. Although the reproduction is made at the same reproduction speed, the first photographing speed is slower than the second photographing speed. Hence, the user feels as if a subject moves slow in the section of 0 degree to 180 degrees, and feels as if the subject moves fast in the section of 180 degrees to 360 degrees.

Meanwhile, the reproduction speed of the processed image may be changed by a user request. Like that the playback speed of a moving picture is adjusted by the user, the reproduction speed of the processed image may be adjusted by the user. For example, the reproduction speed may be changed by a user request, such as a 1-time speed, a 2-time speed, a 0.5-time speed.

Meanwhile, when still images are photographed while the processed image is photographed, icons 1020*a* to 1020*c* corresponding to the still images may be displayed at points at which the still images are photographed in the graphic object. For example, when a processed image is photographed with respect to the section of 0 degree to 180 degrees, and a still image is photographed at a point of 100 degrees, an icon corresponding to the still image may be displayed at a point corresponding to 100 degrees in the graphic object.

Also, information 1010 for guiding a basic photographing direction of the processed image may be included in the graphic object. When the photographing direction is changed in the photographing of the processed image, information 1030 for guiding the changed photographing direction may be additionally included in the graphic object.

Meanwhile, the graphic object may be configured in the form of a progress bar representing all reproduction sections of the processed image and a reproduction point of an image being output on the touch screen.

Figure 10B:
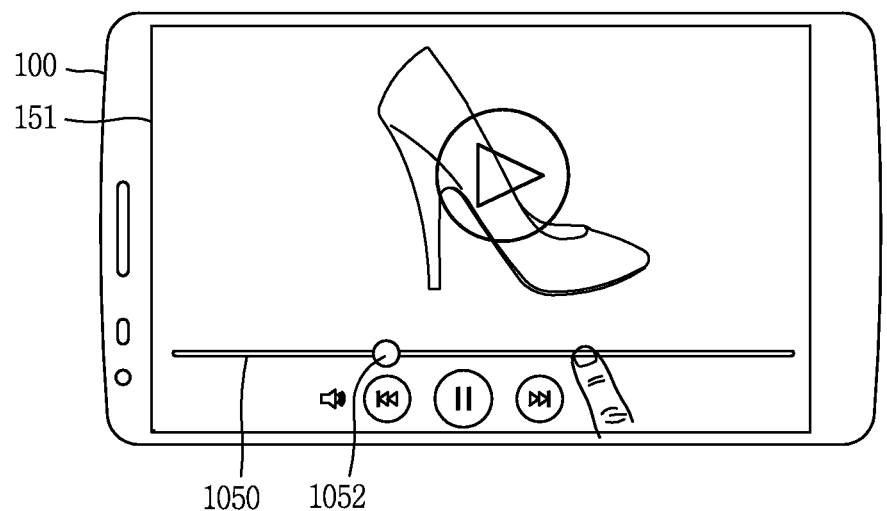
Figure 10B:
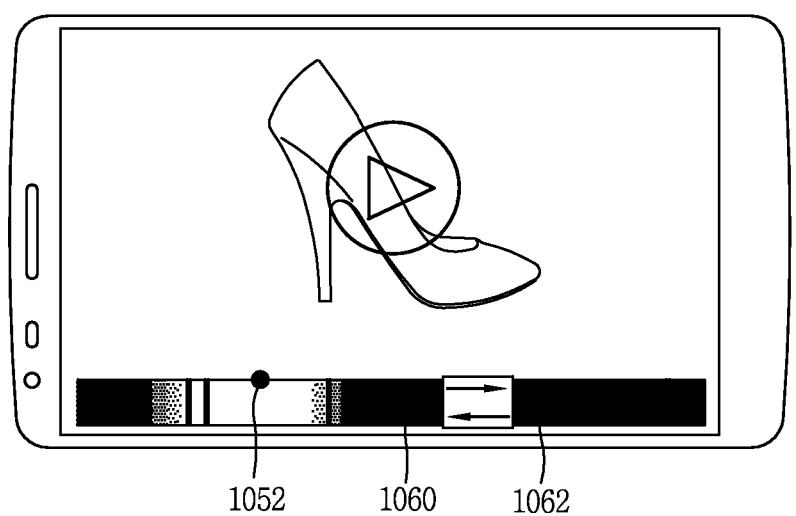

For example, as shown in FIG. 10B, if the reproduction of a processed image is started, a progress bar 1050 may be output, and a graphic image 1052 representing a current reproduction point may be output on the progress bar 1050.

If a long touch input is applied to the progress bar 1050, the controller 180 may output guidance information for guiding a photographing attribute acquired in photographing of the processed image. The guidance information may include at least one of an area in which the photographing is made, an area in which the photographing is not made, a photographing speed for each section, a photographing direction for each section, and a still image photographed at a specific angle. In FIG. 10A, it can be seen that the above-described circular graphic object is changed into a band-shaped graphic object.

Meanwhile, information for guiding a point at which the photographing of the processed image is temporarily stopped and then again started after a predetermined time elapses may be further included in the guidance information. Also, information 1060 for guiding a section at which the photographing was made by turning up the volume louder than a reference volume during the photographing of the processed image and information 1062 for guiding a section at which the photographing angle was changed greater than a reference angle for a predetermined time may be further include in the guidance information.

Figure 10C:
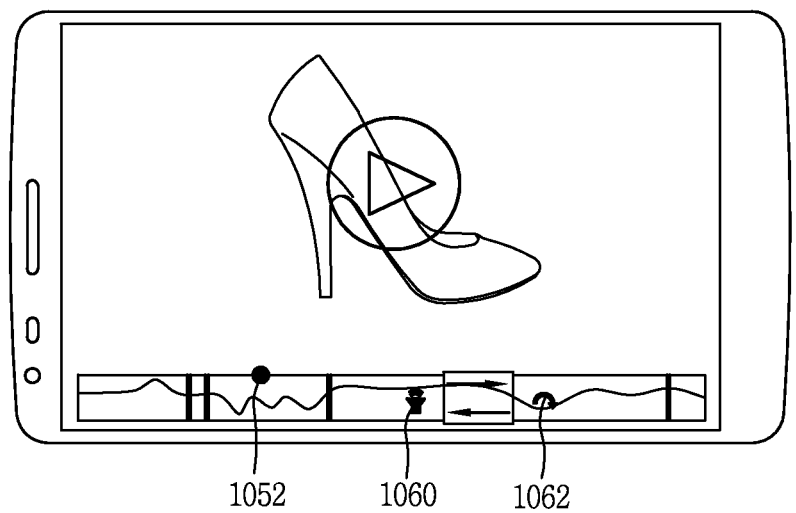

Meanwhile, if a predetermined first user input is applied to the graphic object while the band-shaped graphic object is displayed, as shown in FIG. 10C, vertical movements of the main body, measured during the photographing of the processed image, may be output as a graph. The first user input may be a pinch-out input.

The band-shaped graphic object can well represent lateral movements of the main body, but it is difficult to represent vertical movements of the main body. In order to solve this, the mobile terminal according to the present disclosure may output an altitude graph by measuring a vertical movement of the main body at every unit time and numerically expressing the measured vertical movements as altitudes using the ground level as a reference point. The X-axis of the altitude graph uses a time (or photographing angle) as a variable, and the Y-axis of the altitude graph uses, as a variable, an altitude of the main body, measured at a corresponding time.

Figure 10D:
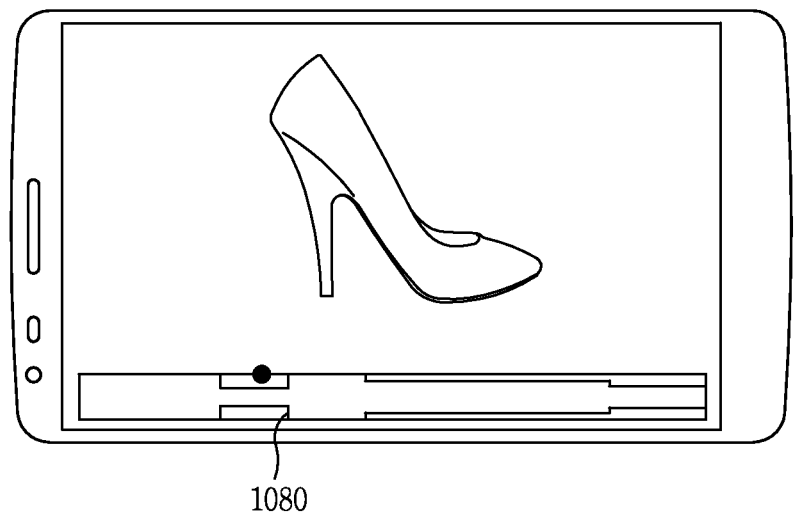

The guidance information may further include information for guiding a zoom ratio of the camera for each section. For example, if a predetermined second user input is applied to the band-shaped graphic object while the graphic object is displayed, as shown in FIG. 10D, a change in zoom of the camera while the processed image is photographed may be output as a zoom graph. The X-axis of the zoom graph uses a time as a variable, and the Y-axis of the zoom graph uses, as a variable, a zoom ratio of the camera at the corresponding time.

Figure 10E:
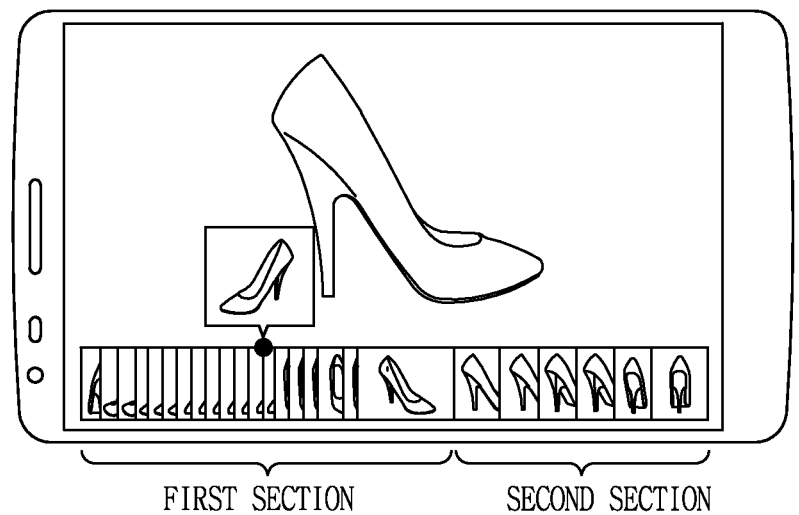

The guidance information may further include information for guiding a photographing speed for each section. More specifically, the controller 180 may divide the entire section of the processed image into a plurality of sections based on the photographing speed. For example, as shown in FIG. 10E, when the processed image is photographed at a first photographing speed or a second photographing speed, the controller 180 may divide the entire section into a first section at which the processed image is photographed at the first photographing speed and a second section in which the processed image is photographed at the second photographing speed. In addition, the controller 180 may extract a predetermined number of representative images in every section, and output the extracted representative images in an order where they are photographed.

The predetermined number may be changed depending on a photographing speed in a corresponding section. For example, if the first photographing speed is 1.5 times faster than the second photographing speed, a first predetermined number in the first section may be set to be 1.5 times greater than a second predetermined number in the second section. Accordingly, a large number of main images are output in a section having a fast photographing speed, so that it is possible to identify the detailed appearance of a subject, and a small number of main images are output in a section having a slow photographing speed, so that it is possible to prevent an identical or similar image from being repeatedly output.

Meanwhile, the guidance information may further include information for guiding a place at which the processed image is photographed. The processed image may be generated through photographing made once, or may be generated through photographing made plural times. When the processed image is generated through the photographing made once, the controller 180 generates the processed image in such a manner that images generated through photographing newly made from the point at which the previous photographing is ended are continuously attached. When the processed image is made through the photographing plural times, information for guiding at least one of a photographing time and a photographing place in a corresponding section may be further included in the guidance information.

Figure 11A:
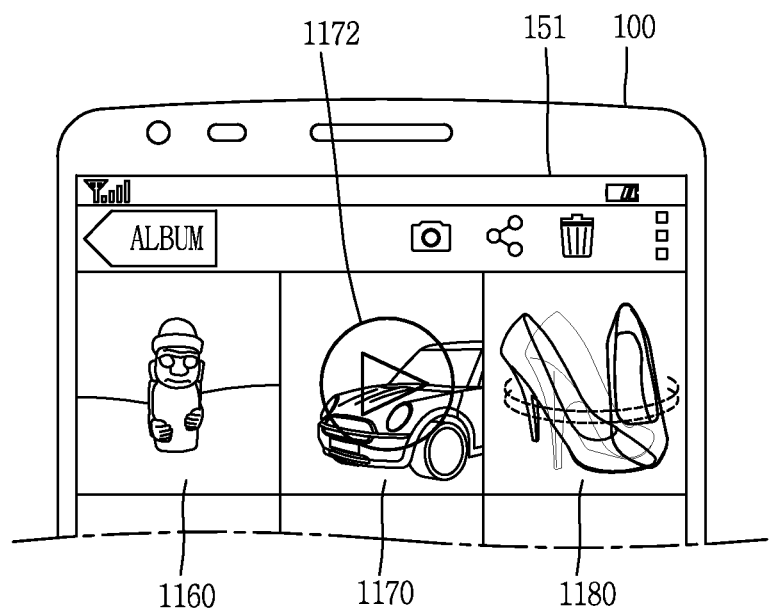
FIG. 11A is a diagram illustrating a method of displaying a processed image to be distinguished from another kind of image as a method of outputting a gallery.

FIG. 11A is a diagram illustrating a method of displaying a processed image to be distinguished from another kind of image as a method of outputting a gallery.

The controller 180 may output, in a list form, at least one of a picture 1160, a moving picture 1170, and a processed image 1180, which are stored in the memory 170. Specifically, if an application for providing stored images is executed, the controller 180 may provide thumbnail views of the images stored in the memory 170.

In this case, the controller 180 controls the touch screen 151 to display the picture 1160, the moving picture 1170, and the processed image 1180 to be distinguished from one another. For example, the controller 180 may display a graphic object 1172 related to moving picture reproduction on a thumbnail image of the moving picture 1170. In the case of a thumbnail image of the processed image 1180, the controller 180 may control the touch screen 151 such that the thumbnail image moves while periodically rocking. Accordingly, a user can recognize the kinds of images.

When the thumbnail image of the processed image 1180 is output, the controller 180 may sequentially output a plurality of images included in the processed image 1180. The plurality of images are images obtained by photographing the same subject at different angles, and therefore, the user may feel as if the subject rotates on the touch screen 151.

Figure 11B:
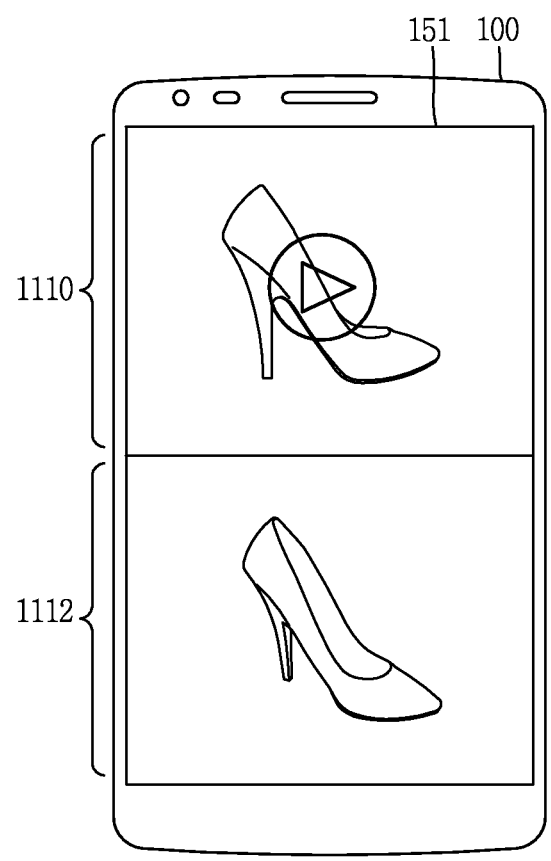
FIGS. 11B to 11D are diagrams illustrating a method of simultaneously outputting a processed image and a still image when the processed image and the still image are simultaneously photographed.
Figure 11C:
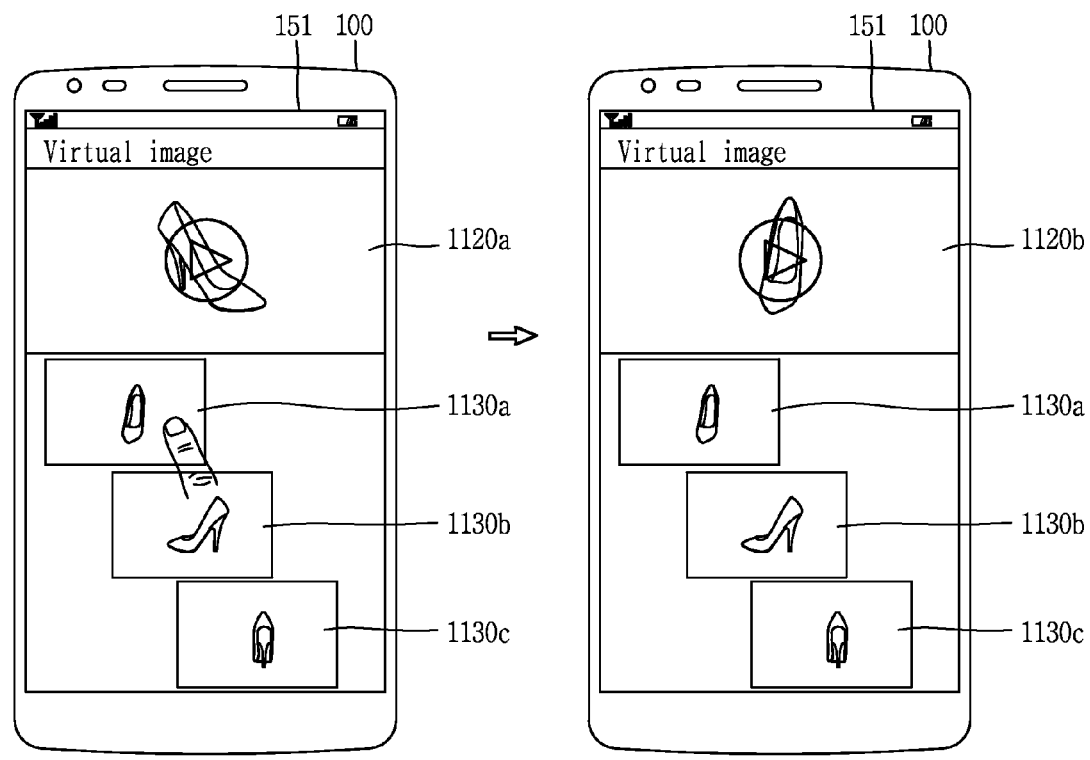
Figure 11D:
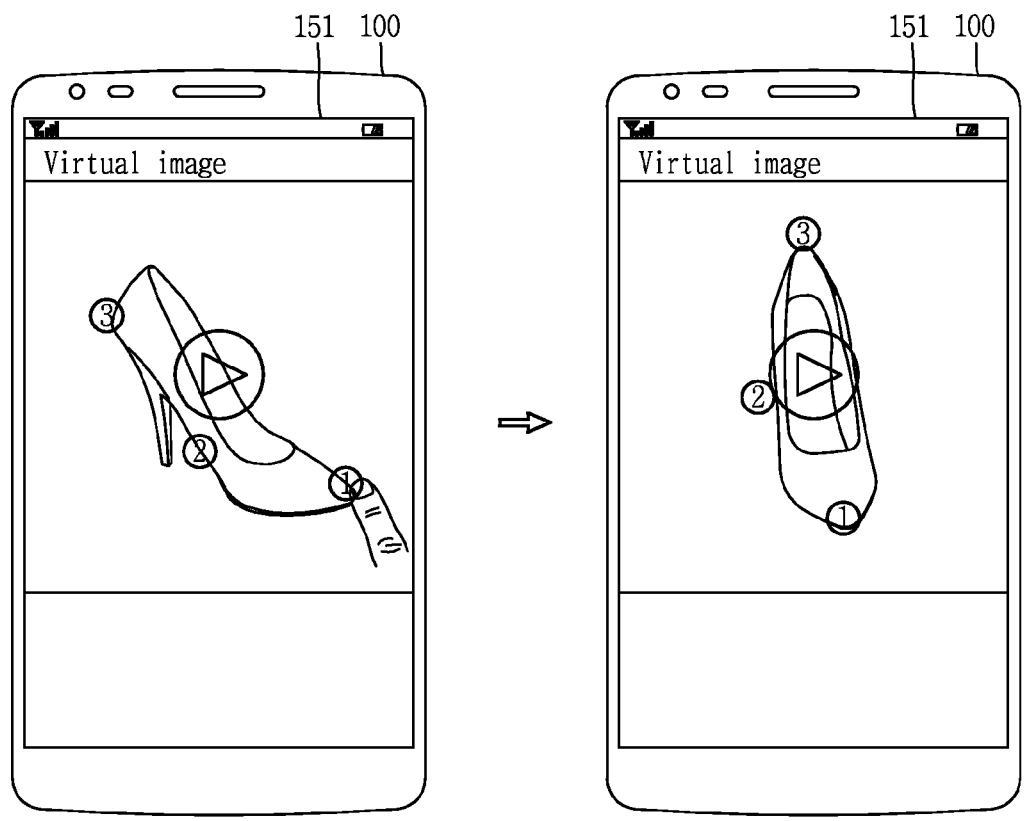

FIGS. 11B to 11D are diagrams illustrating a method of simultaneously outputting a processed image and a still image when the processed image and the still image are simultaneously photographed.

As described above in FIG. 7B, a still image may be photographed while a processed image is generated. The photographed still image is stored independently from the processed image.

Meanwhile, when a processed image or a still image is output on the touch screen 151, as shown in FIG. 11B, the controller 180 may divide the entire area of the touch screen 151 into a first area 1110 and a second area 1112, and control the touch screen 151 to output the processed image in the first area 1110 and output the still image in the second area 1112. That is, a plurality of images constituting the processed image are sequentially displayed in the first area 1110, and a still image photographed while the processed image is photographed is displayed in the second area 1112.

Meanwhile, when a point at which a still image is photographed is reproduced in the reproduction of a processed image, the controller 180 may change a reproduction speed. More specifically, the controller 180 reproduces the processed image at a first reproduction speed, and reproduces, at a second reproduction speed, a predetermined section including the point at which the still image is photographed. For example, when the controller 180 reproduces the processed image at the 1-time speed and then reproduces a predetermined section including the point at which the still image is photographed, the predetermined section is reproduced at the 0.5-time speed. If the reproduction of the predetermined section is ended, the processed image is again reproduced at the 1-time speed. Since a portion at which the still image is photographed is automatically slowly reproduced, the user can observe the corresponding portion in detail.

The processed image and the still image, which are respectively output in the first and second areas 1110 and 1112, are independently controlled. Specifically, the controller 180 controls the output of the processed image by using a touch input applied to the first area 1110, and controls the output of the still image by using a touch input applied to the second area 1112. For example, an image is enlarged or reduced by a pinch-in input or a pinch-out input. In this case, the control of the first area 1110 has no influence on the second area 1112.

Meanwhile, when a touch input is applied to the still image, the controller 180 may adjust a reproduction point of the processed. More specifically, when a touch input is applied to the still image while the processed image is output, the controller 180 may move the reproduction point of the processed image to the point at which the still image is photographed.

As shown in FIG. 11C, a case where a total of three still images 1130a to 1130c are photographed while a processed image is photographed will be described as an example. When the processed image is output, the controller 180 may output, as a representative image 1120a of the processed image, any one of a plurality of images included in the processed image, or may sequentially output the plurality of images according to a reproduction order. In this case, at least one of the still images 1130a to 1130c may be output together with the processed image.

Meanwhile, when a touch input is applied to any one of the still images 1130a to 1130c, the controller 180 moves the reproduction point of the processed image to the point at which the one still image is photographed. Therefore, the representative image of the processed image may be changed (1120a→1120b), or the reproduction may be made from the point at which the one still image is photographed.

Referring to FIG. 11D, when a processed image is output, the controller 180 may output, on the processed image, a graphic object for guiding a portion at which a still image is photographed. More specifically, the controller 180 may output, as a representative image, any one of a plurality of images included in the processed image, and output, on the representative image, a graphic object for guiding the portion at which the still image is photographed. For example, when still images of front, right, and rear of a subject are photographed, a first graphic object corresponding to a front still image may be displayed in an area corresponding to the front of the subject in the entire area of the representative image, a second graphic object corresponding to a right still image may be displayed in an area corresponding to the right of the subject in the entire area of the representative image, and a third graphic object corresponding to a rear still image may be displayed in an area corresponding to the rear of the subject in the entire area of the representative image. If a touch input is applied to any one of the first to third graphic objects, the controller 180 moves the reproduction point of the processed image to the point at which the one still image is photographed. Accordingly, the representative image of the processed image is changed.

Figure 12A:
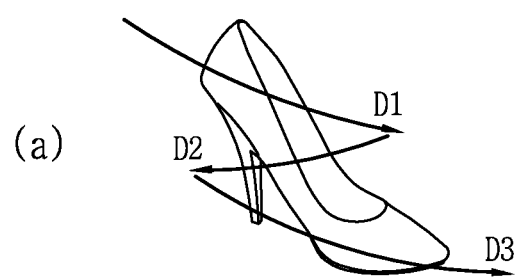
FIGS. 12A to 12C are diagrams illustrating a method of outputting a processed image when a repeatedly photographed section is generated.
Figure 12A:
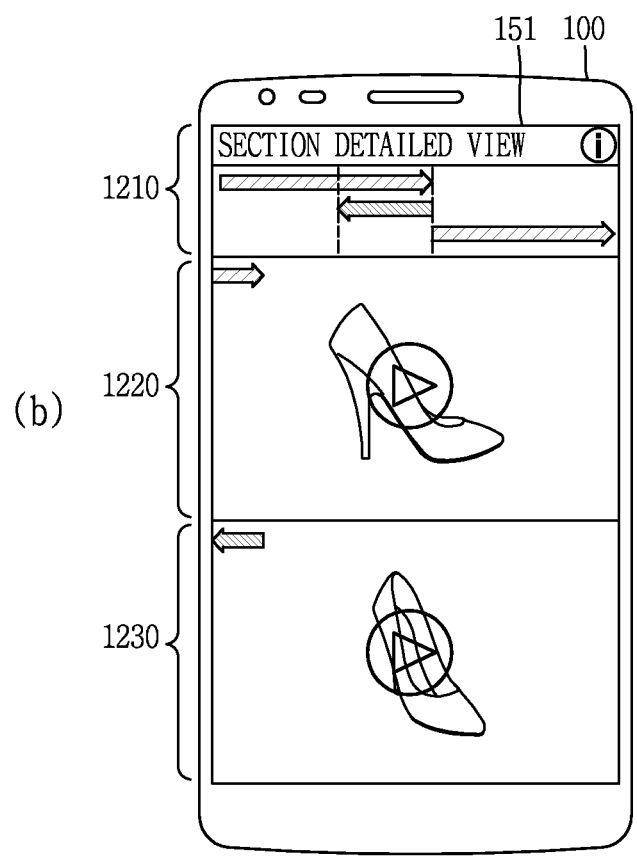
Figure 12B:
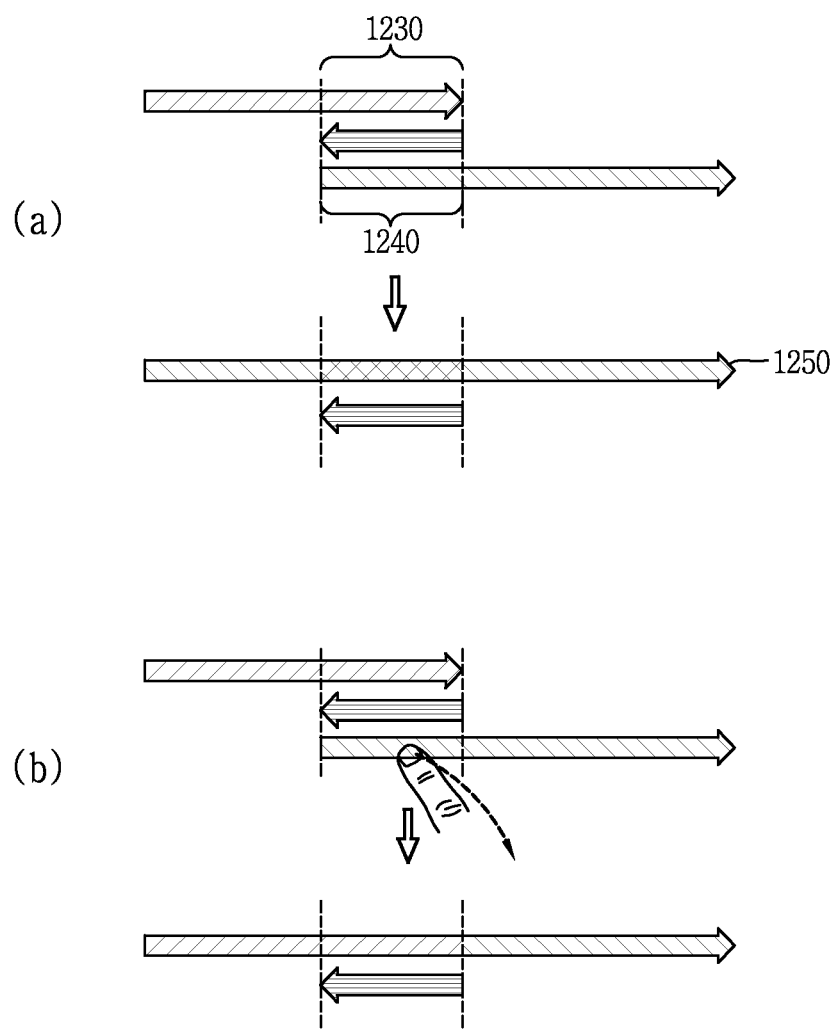
Figure 12C:
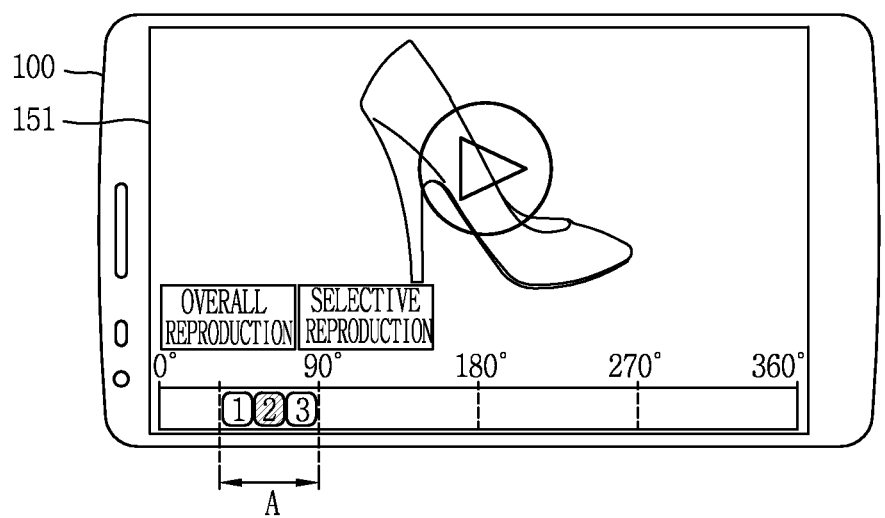

FIGS. 12A to 12C are diagrams illustrating a method of outputting a processed image when a repeatedly photographed section is generated.

As described above in FIG. 7C, as the photographing direction is changed while a processed image is photographed, a repeatedly photographed section may be generated. When a processed image having a repeatedly photographed section is output, the controller 180 may provide a section detailed view function based on a photographing direction.

When the section detailed view function is performed, the controller 180 may output photographing direction information 1210. The photographing direction information 1210 includes information on a photographing start angle in a specific photographing direction, a photographing end angle, a total photographing section (or total photographing angle), and the specific photographing direction. For example, when the processed image is photographed as shown in (a) of FIG. 12A, the photographing direction information may include first to third photographing direction information D1 to D3.

The controller 180 may reproduce a processed image in a partial section corresponding to an arbitrary photographing direction. For example, as shown in (b) of FIG. 12A, a first section corresponding to the first photographing direction information and a second section corresponding to the second photographing direction information may be displayed in different areas 1220 and 1230 of the touch screen 151, respectively. That is, the controller 180 may simultaneously reproduce images photographed while moving a first direction and images photographed while moving in a second direction. Thus, a user can identify, at a glance, a repeatedly photographed section.

Meanwhile, as shown in (a) of FIG. 12B, an unnecessarily repeated section may be generated due to a change in photographing change. For example, the first photographing direction information D1 and the third photographing direction information D3 have repeatedly photographed sections 1230 and 1240, respectively. In this case, the controller 180 may put together repetition sections photographed in the same direction as one section. In this case, the controller 180 may selectively extract an image well photographed without shaking, and exclude the other images from the processed image. Alternatively, as shown in (b) of FIG. 12B, the controller 180 may select any one of the repetition sections based on a user input, and exclude the other of the repetition sections from the processed image.

Meanwhile, when a processed image is output, the controller 180 may output a graphic object for guiding a photographing attribute acquired when the processed image is photographed. The graphic object represents a virtual photographing area set around a subject.

When a repeatedly photographed section exists due to a change in photographing direction, the controller 180 may divide the repeatedly photographed section into a subsections based on the photographing direction. For example, as shown in FIG. 12C, a repeatedly photographed section A may be divided into first to third sub-sections according to the photographing direction.

When the repeatedly photographed section A is reproduced, the controller 180 may continuously reproduce all area of the repeatedly photographed section A, or may limitedly reproduce only any one among the sub-sections included in the repeatedly photographed section A. As an example, if "overall reproduction" is selected, the controller 180 continuously reproduces all the areas of the repeatedly photographed section A. As another example, if "selective reproduction" is selected, the controller 180 selects any one of the sub-sections included in the repeatedly photographed section A, based on a user input. When the repeatedly photographed section A is reproduced, the controller 180 limitedly reproduces only the selected sub-section. The selected sub-section may be highlight-processed, to be distinguished from the unselected sub-sections.

Figure 13A:
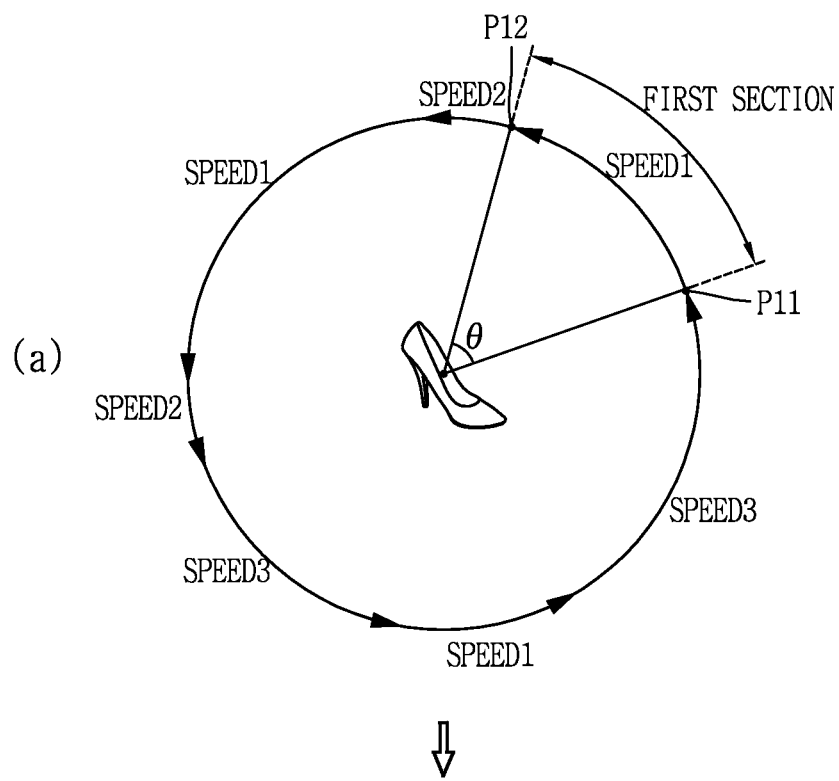
FIGS. 13A to 13C are diagrams illustrating a method of adjusting a reproduction speed for each section of a processed image according to the kind of a subject.
Figure 13A:
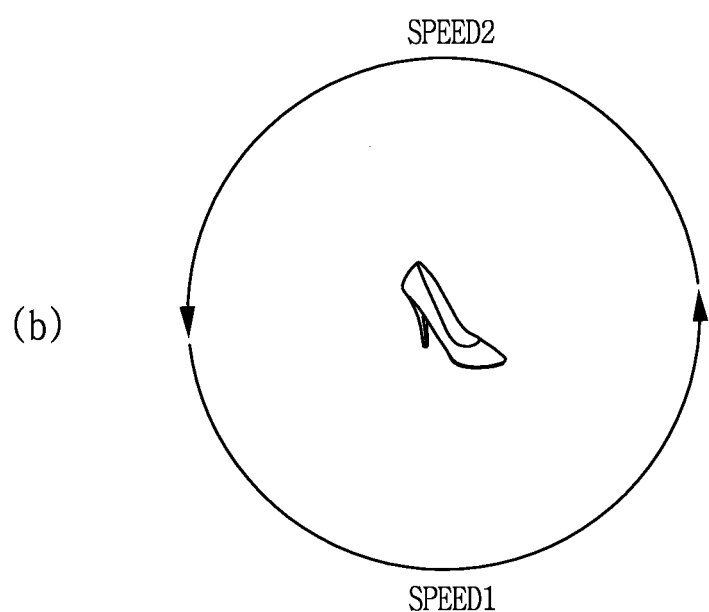
Figure 13B:
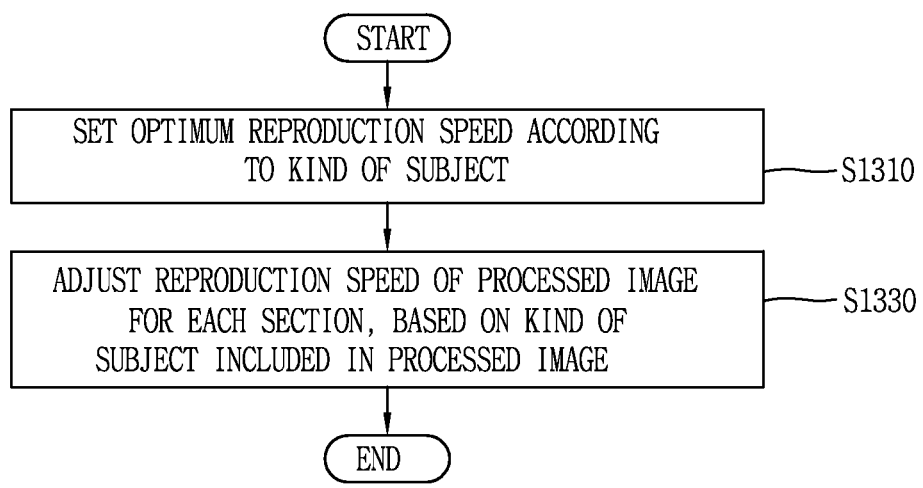
Figure 13C:
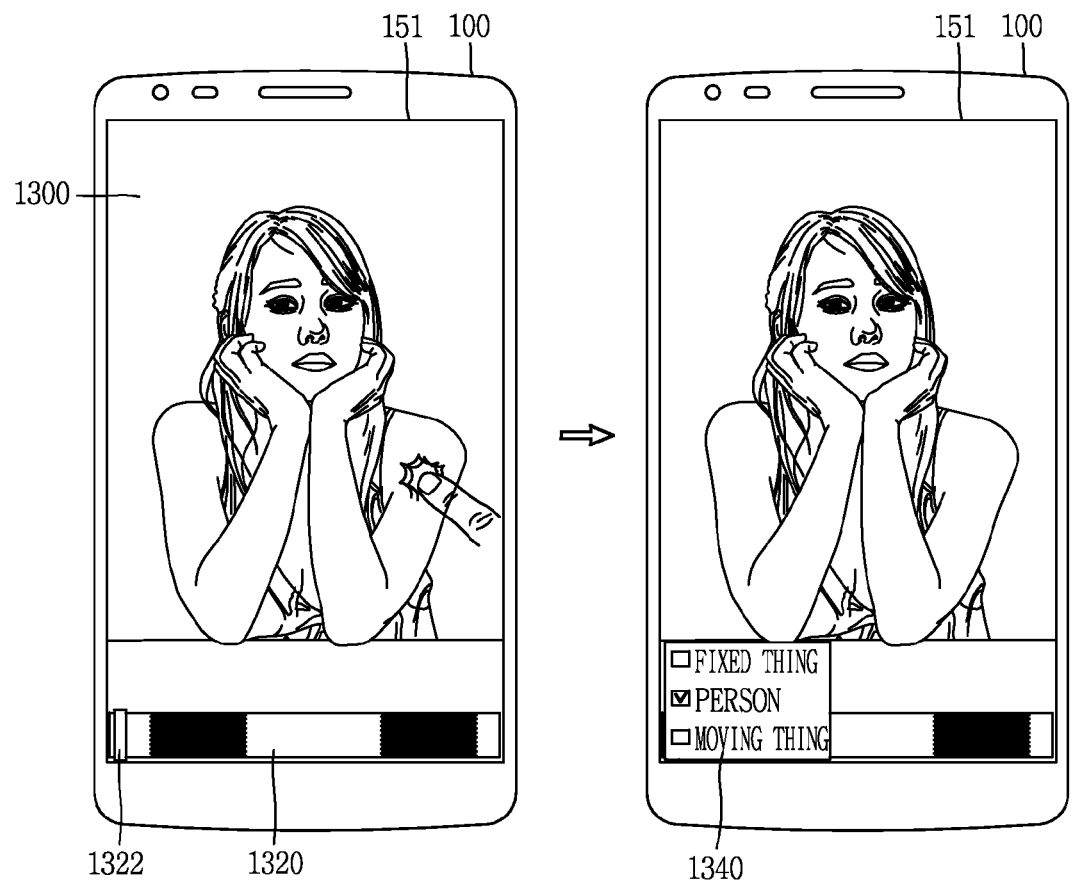

FIGS. 13A to 13C are diagrams illustrating a method of adjusting a reproduction speed for each section of a processed image according to the kind of a subject.

A processed image is photographed by a user, and hence a photographing speed may be changed for each section. The photographing speed may mean a photographing angle (or angular speed) changed for a unit time. For example, as shown in (a) of FIG. 13A, when the processed image is photographed from a first point P11 to a second point P12 for a time t, the photographing speed in a first section may be 'θ/t.'

In terms of characteristics of the processed image photographed at various angles, the photographing speed is to be necessarily constant with respect to the entire section. This is because a perspective formed by the processed image is maximized when the photographing speed is consistent.

When a processed image is output, the mobile terminal according to the present disclosure may adjust the reproduction speed of the processed image based on a predetermined reference. Alternatively, when a processed image is generated and stored in the memory 170, the mobile terminal according to the present disclosure may adjust the reproduction speed of the processed image to correspond to a predetermined reference. For example, the processed image photographed as shown in (a) of FIG. 13A may be reproduced as shown in (b) of FIG. 13A, or may be changed and stored in the memory 170 to be reproduced as shown in (b) of FIG. 13A.

Referring to FIG. 13B, the controller 180 may set an optimum reproduction speed for each section according to the kind of a subject included in the processed image (S1310).

As an example, when the subject is a person, a face including eyes, a nose, and a mouth is an object of main interest. Therefore, when the face is output, it is required to reproduce the face more slowly than when a portion except the face is output. A predetermined reference with respect to the person may be set such that an area including the eyes is reproduced at a first speed, an area including the face except the eyes is reproduced at a second speed faster than the first speed, and an area excluding the face is reproduced at a third speed faster than the second speed.

As still another example, when the subject is not a person but a fixed thing, it is required to equally reproduce all sections. A predetermined reference with respect to the fixed thing may be set such that all the sections are reproduced at a fourth speed.

As still another example, when the subject is not a person but a moving thing, it is required to reproduce a section having no movement faster than a section having a movement. Therefore, a predetermined reference with respect to the moving thing may be set such that a section having a movement is produced at a fifth speed, and a section having no movement is reproduced at a sixth speed slower than the fifth speed.

As still another example, when a still image is simultaneously photographed while the processed image is photographed, the reproduction speed of the processed image may be adjusted such that a predetermined section including a point at which the still image is photographed is reproduced slower than the other sections.

As still another example, when the photographing is made at a speed slower than the minimum reference speed in a predetermined section or when the photographing is made at a speed faster than the maximum reference speed in the predetermined section, the controller 180 may adjust the reproduction speed of the predetermined section to correspond to an average speed of the other sections except the predetermined section.

The kind of the subject and the predetermined reference corresponding thereto may be set by a terminal provider when the terminal is released from a factory, or may be reset by a user input. However, the present disclosure is not limited to the above-described examples, and the kind of the subject and the predetermined reference corresponding thereto may be variously modified according to exemplary embodiments.

Next, the controller 180 may adjust a reproduction speed of the processed image for each section, based on the kind of the subject included in the processed image (S1330).

The controller 180 may reproduce the processed image, corresponding to the photographing speed. In addition, when a user request is received, the controller 180 may reproduce the processed image by adjusting the reproduction speed of the processed image according to the kind of the subject included in the processed image.

Specifically, the controller 180 selects any one reference corresponding to the subject included in the processed image among one or more predetermined references, and adjust the reproduction of the processed image to correspond to the selected reference.

For example, as shown in FIG. 13C, when a processed image 1300 is output, an indicator 1320 corresponding to the processed image 1300 may be output. The indicator 1320 includes speed information for guiding a photographing speed of the processed image for each section and guidance information 1322 for guiding any one image being output on the touch screen 151 among a plurality of images constituting the processed image.

The user may apply a user gesture to the mobile terminal 100, thereby controlling the output of the processed image 1300. For example, the user may visually identify a subject at various angles by vertically/laterally flicking the processed image 1300 or by vertically/laterally rotating the main body. That is, the subject may be rotated.

Although a separate user gesture is not applied from the user, the controller 180 may sequentially output a plurality of images constituting the processed image 1300 based on a central point of the processed image. In this case, the output speed of the processed image 1300 corresponding to the photographing speed.

Meanwhile, the user may apply a long touch input to the touch screen 151 or continuously tap the touch screen 151 plural times, to apply a user request such that the reproduction speed of the processed image 1300 corresponds to a predetermined reference. The controller 180 may control the output of the processed image 1300 in response to the user request such that the reproduction speed of the processed image 1300 corresponds to the predetermined reference.

The controller 180 selects any one reference corresponding to the subject included in the processed image among one or more predetermined references, and adjusts the reproduction speed of the processed image to correspond to the selected reference.

Further, the controller 180 may display the one or more predetermined references 1340 in response to a user request. In this case, the controller 180 performs highlight processing on at least one reference corresponding to the subject included in the processed image to be distinguished from references not corresponding to the subject included in the processed image. For example, when the one or more predetermined references include a 'fixed thing,' a 'person,' and a 'moving thing,' and the processed image 1300 output on the touch screen 151 is related to the 'person,' the controller 180 may perform highlight processing on the 'person' to be distinguished from the 'fixed thing' and the 'moving thing.'

The selected reference may be changed into another reference by a user input. For example, if the 'fixed thing' is selected by the user while the processed image 1300 is reproduced based on a reference corresponding to the 'person,' the processed image 1300 is reproduced based on a reference corresponding to the 'fixed thing.'

As described above, the mobile terminal according to the present disclosure can adjust the reproduction speed of the processed image for each section according to the kind of the subject included in the processed image. Accordingly, the processed image is reproduced at an optimum reproduction speed according to the kind of the subject included in the processed image.

Meanwhile, the reproduction speed of the processed image for each section may be changed depending on a photographing attribute included in the processed image. That is, when the processed image is output, the controller 180 may adjust the reproduction speed of a plurality of images constituting the processed image, based on the photographing attribute.

The photographing attribute includes at least one of a photographing angle defined by the camera and the subject, a moving direction of the camera, a moving speed of the camera, and a magnification of the camera. As an example, the controller 180 may reproduce the processed image at different speeds according to the magnification of the camera, or may reproduce the processed image at different speed according to the photographing angle. As another example, when a still image is independently stored while the processed image is photographed, the reproduction speed of the processed image may become relatively slow at the point at which the still image is photographed.

Figure 14A:
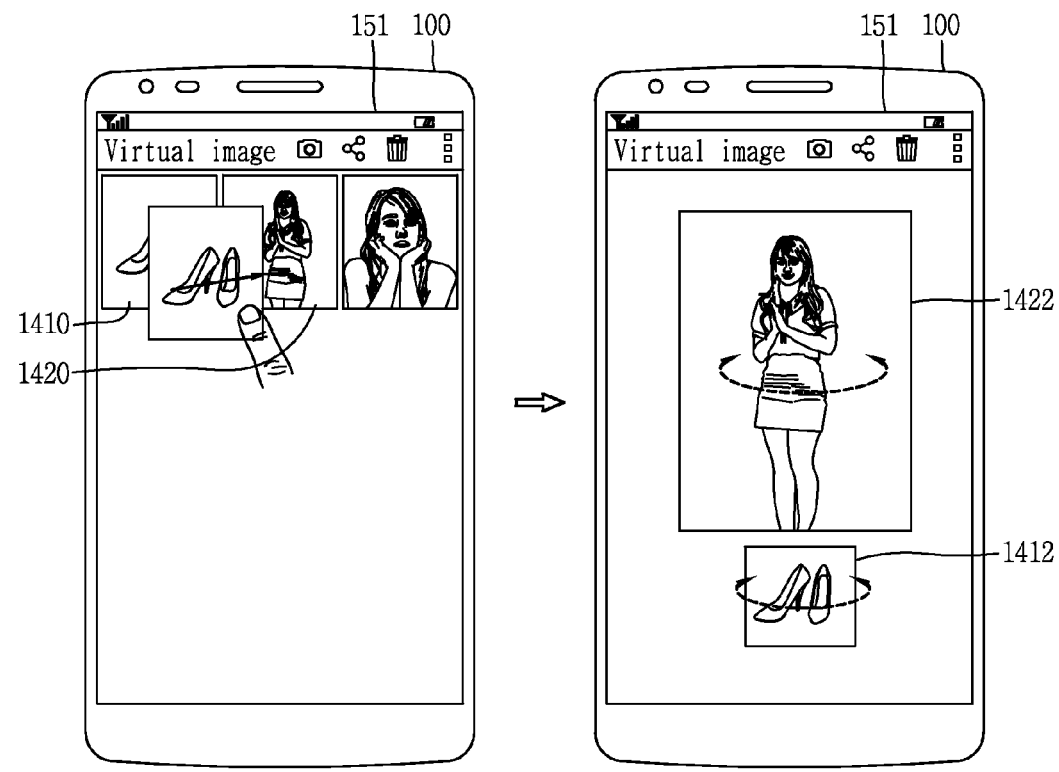
FIGS. 14A and 14B are diagrams illustrating a method of simultaneously outputting different processed images.
Figure 14B:
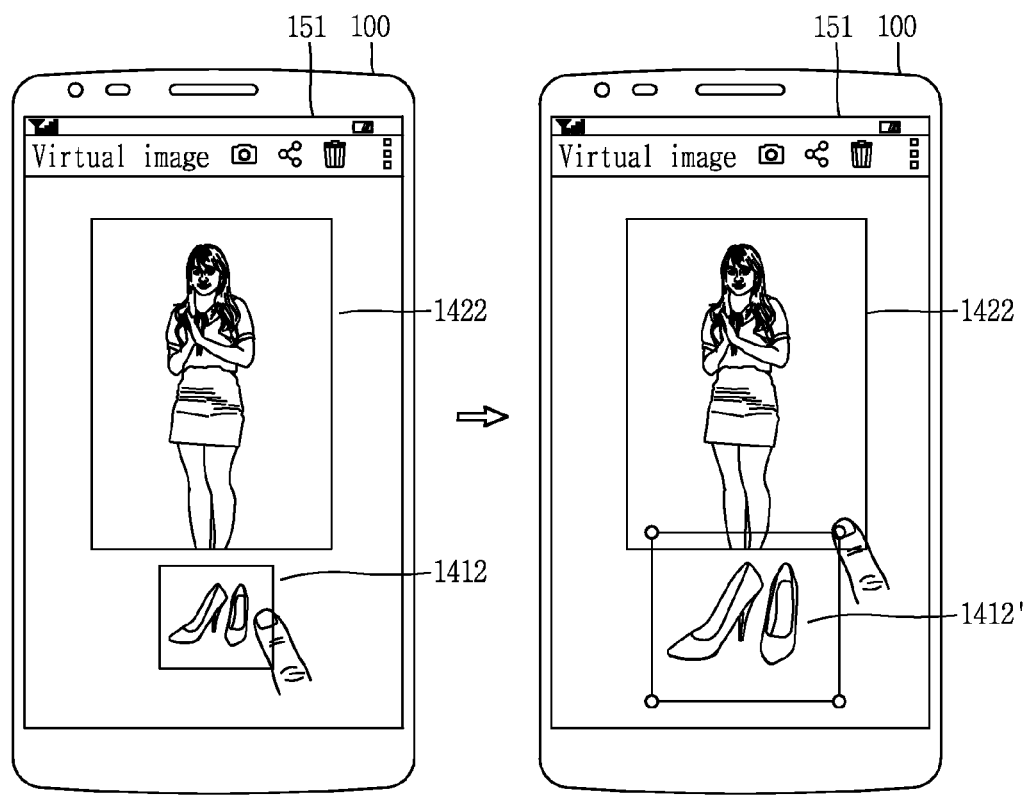

FIGS. 14A and 14B are diagrams illustrating a method of simultaneously outputting different processed images.

The mobile terminal 100 according to the present disclosure may simultaneously output different processed images on the touch screen 151, and simultaneously control the different processed images based on a user gesture. For example, the controller 180 may control the touch screen 151 to simultaneously output a first processed image obtained by photographing a first subject and a second processed image obtained by photographing a second subject. Also, the controller 180 may simultaneously control the first and second processed images such that an image photographed at a specific photographing angle is output based on a user gesture.

For example, referring to FIG. 14A, the touch screen 151 displays first and second thumbnail views 1410 and 1420 respectively corresponding to the first and second processed images on an execution screen of an application for providing a stored image.

The controller 180 controls the touch screen 151 such that the first and second processed images 1412 and 1422 are simultaneously output based on a touch input applied to the first and second thumbnail views 1410 and 1420. For example, when a drag input moving from any one to the other of the first and second thumbnail views 1410 and 1420 is applied, the first and second processed images 1412 and 1422 may be simultaneously output.

The controller 180 extracts a first reference image among a plurality of images constituting the first processed image 1412, and controls the touch screen 151 to output the first reference image. In this case, the controller 180 extracts a second reference image among a plurality of images constituting the second processed image 1422, and controls the touch screen 151 to simultaneously output the second reference image together with the first reference image.

A reference image may mean a front image of a subject included in a processed image. For example, a front image of the first processed image 1412 obtained by photographing shoes may be extracted as the first reference image, and a front image of the second processed image 1422 obtained by photographing a person may be extracted as the second reference image. The mobile terminal according to the present disclosure may be provided with a predetermined algorithm for extracting a front image of a specific subject.

Alternatively, the reference image may mean an initial image captured when a processed image is photographed among a plurality of images constituting the processed image. The initial image captured when the processed image is photographed may be set as the reference image.

When the first and second processed images 1412 and 1422 are simultaneously output, the controller 180 may adjust the size of at least one of the first and second processed images 1412 and 1422 such that both the first and second processed images 1412 and 1422 are output on one screen.

The first and second processed images 1412 and 1422 may be displayed to at least partially overlap each other according to the kind of a subject included in each processed image. For example, as shown in FIG. 14A, when shoes are included in the first processed image 1412 and a person is included in the second processed image 1422, the first processed image 1412 may be displayed on the second processed image 1422 to overlap the second processed image 1422 such that the shoes are displayed at ankles of the person. Although not shown in this figure, when the second processed image 1422 including the person and a third processed image including a trench coat are simultaneously output, the second processed image 1422 and the third processed image may be displayed to overlap each other by adjusting the size of the third processed image such that the trench coat fits the person.

The location and size of at least one of the first and second processed images 1412 and 1422 may be adjusted by a user input. For example, as shown in FIG. 14B, when a long touch input is applied to the first processed image 1412, an editing mode of the first processed image 1412 may be provided. The controller 180 may change the location of the first processed image 1412, or may enlarge or reduce the size of the first processed image (1412→1412'), based on a touch input applied to the first processed image 1412.

Meanwhile, when different processed images are simultaneously displayed, subjects included in the different processed images are rotated in the same direction. In other words, when the first and second processed images are simultaneously output, the output of the first and second processed images is controlled such that the first and second subjects are rotated in the same direction.

The rotation direction and rotation angle of a subject are determined by a user gesture. The rotation direction and rotation angle are equally applied to different processed images.

Since different processed images are simultaneously displayed, the user can view, at a glance, different objects while comparing the different objects, and observe the different objects at various angles. When the method is applied to online shopping, the user can obtain an effect as if the user wears an actual product.

Figure 15A:
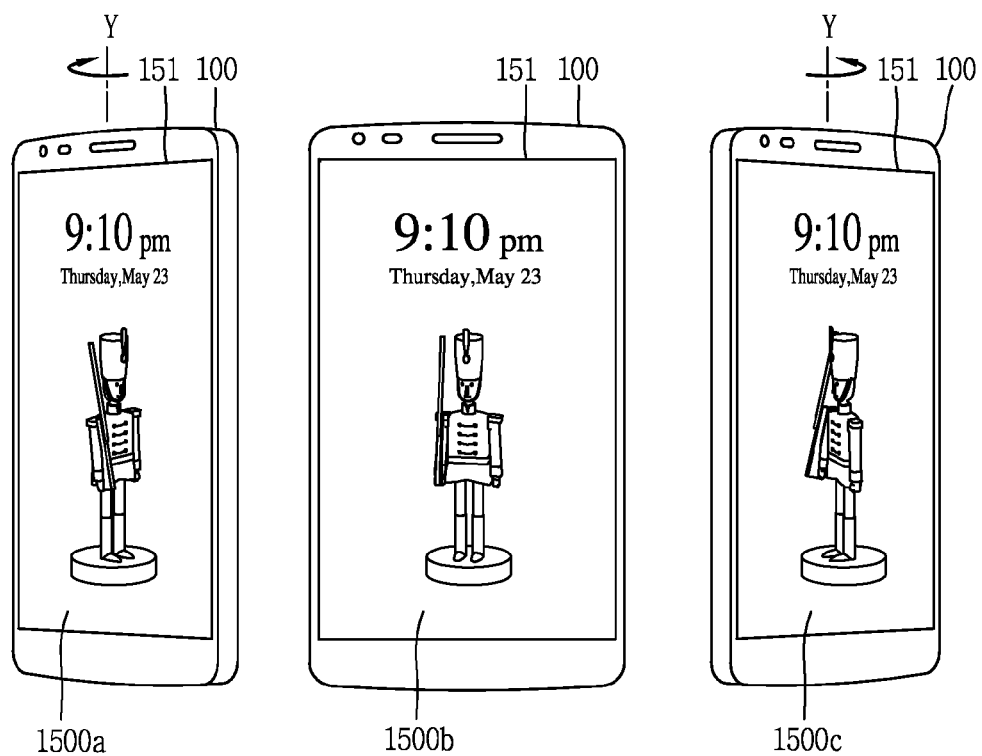
FIG. 15A is a diagram illustrating an exemplary embodiment in which a processed image is used as a lock screen.

FIG. 15A is a diagram illustrating an exemplary embodiment in which a processed image is used as a lock screen.

If the state of the mobile terminal satisfies a predetermined condition, the controller 180 may execute a lock state for limiting a user input to applications. If a display of the touch screen 151 is turned on in the lock state, the touch screen 151 outputs a lock screen. The controller 180 uses a touch input applied to the touch screen in the lock state to release the lock state. If a touch input is applied in the lock state, the controller 180 compares the applied touch input with a predetermined touch input so as to release the lock state, and releases or maintain the lock state based on the comparison result. Specifically, when the predetermined touch input and the applied touch input are matched to each other, the lock state may be released, and a home screen or an execution screen of a most recently executed application may be displayed on the touch screen 151. On the other hand, when the predetermined touch input and the applied touch input are not matched to each other, the lock state is maintained, and the lock screen is continuously output.

Meanwhile, the lock screen may include a background image. In this case, the processed image may be output as a background image of the lock screen by a user selection or a setting of the controller 180. When the processed image is output as the background image of the lock screen, any one image among a plurality of images constituting the processed image is output as the background image of the lock screen. When a movement of the main body is sensed while the one image is output, the controller 180 outputs another image among the plurality of images as the background image of the lock screen, based on the movement of the main body.

For example, when the display of the touch screen is turned off and then turned on in the lock state, a front image 1500b obtained by photographing a front of a subject in the processed image is output as the background image of the lock screen. When the main body rotates to the left side around a virtual axis Y, the controller 180 outputs a left side image 1500a obtained by photographing a left side of the subject. When the main body rotates to the right side based on the virtual axis Y, the controller 180 outputs a right side image 1500c obtained by photographing a right side of the subject.

As the background image of the lock screen is varied based on the movement of the main body, and thus the user can allow the background image of the lock screen to be output in various manners according to user's tastes.

Figure 15B:
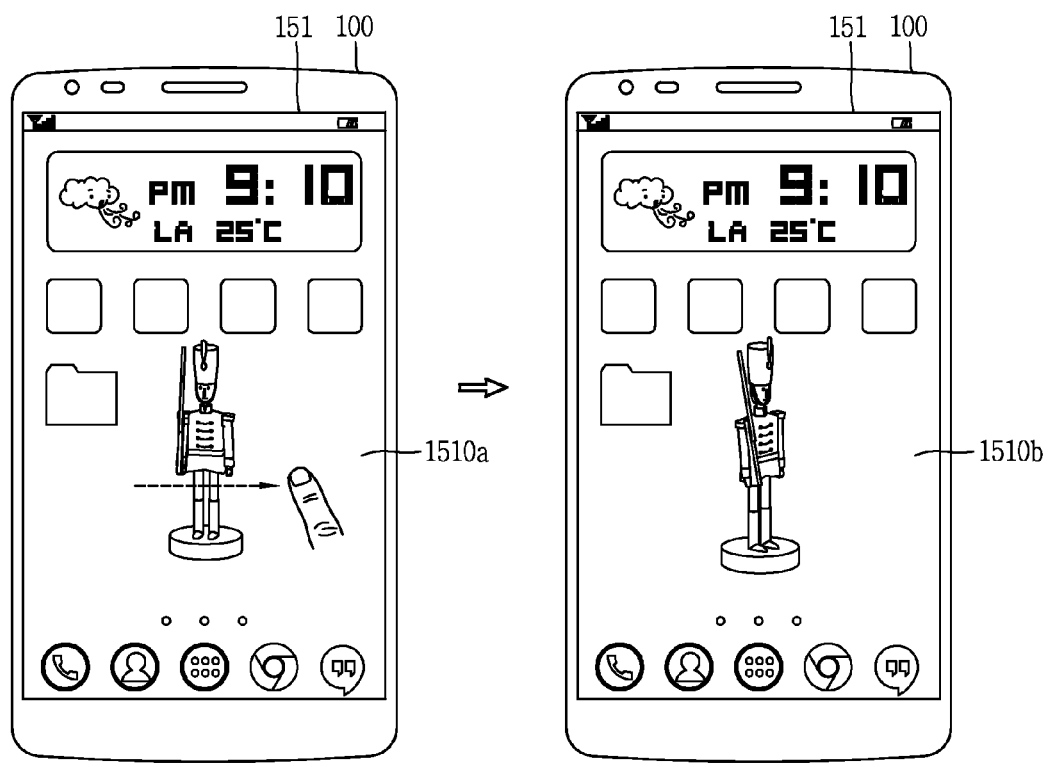
FIG. 15B is a diagram illustrating an exemplary embodiment in which a processed image is used as a background screen of a home screen page.

FIG. 15B is a diagram illustrating an exemplary embodiment in which a processed image is used as a background screen of a home screen page.

A home screen page may be output on the display unit 151 of the mobile terminal. The home screen page may include at least one object, and the object may be an icon or widget of an application installed in the mobile terminal In addition, the home screen page includes a background image, and the object is displayed on the background image of the home screen page.

As described above, a processed image may be output as the background image of the home screen page. When the processed image is output as the background image of the home screen page, any one image among a plurality of images constituting the processed image is output as the background image of the home screen page. When a movement of the main body is sensed while the one image is output, the controller 180 outputs, as the background image of the home screen page, another image among the plurality of images constituting the processed image, based on the movement of the main body.

The controller 180 may change the background image being output from any one image to another image among a plurality of images constituting the processed image, based on a touch input applied to the background image of the home screen page. More specifically, when a touch input continuously moving clockwise or counterclockwise around a subject included in the background image is sensed, the controller 180 changes the background image of the home screen page based on the sensed touch input.

For example, as shown in FIG. 15B, when a touch input continuously moving clockwise while a first image 1510a among the plurality of images included in the processed image is output as the background of the home screen page, the controller 180 outputs a second image 1510b among the plurality of images as the background image of the home screen page such that the user feels as if the subject rotates clockwise. Whenever the touch input moves by a predetermined distance, the background image of the home screen page is changed.

Figure 16A:
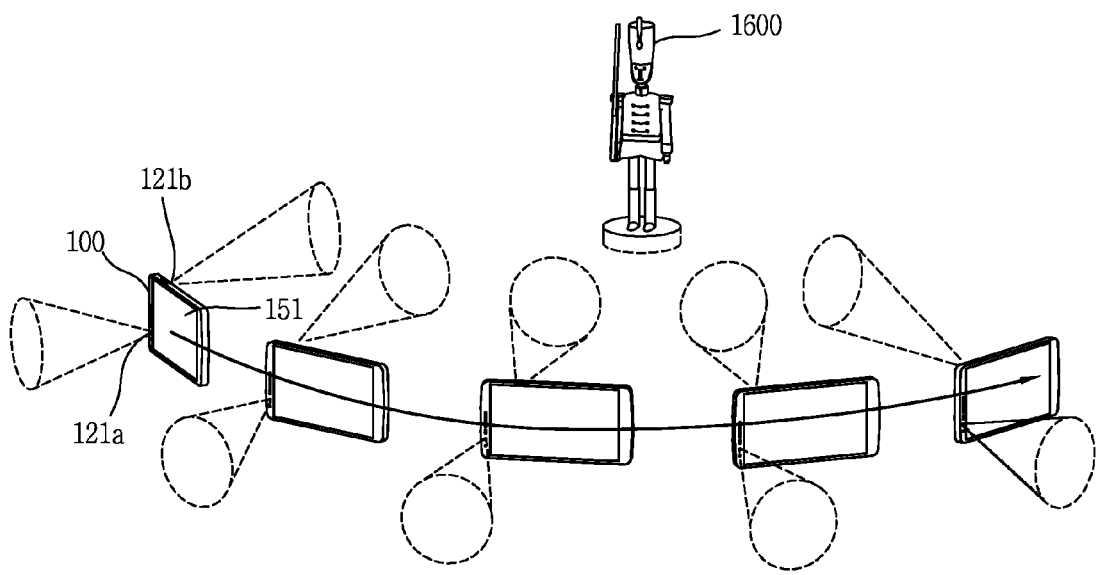
FIGS. 16A and 16B are diagrams illustrating a method of generating a processed image by using images photographed by different cameras.
Figure 16B:
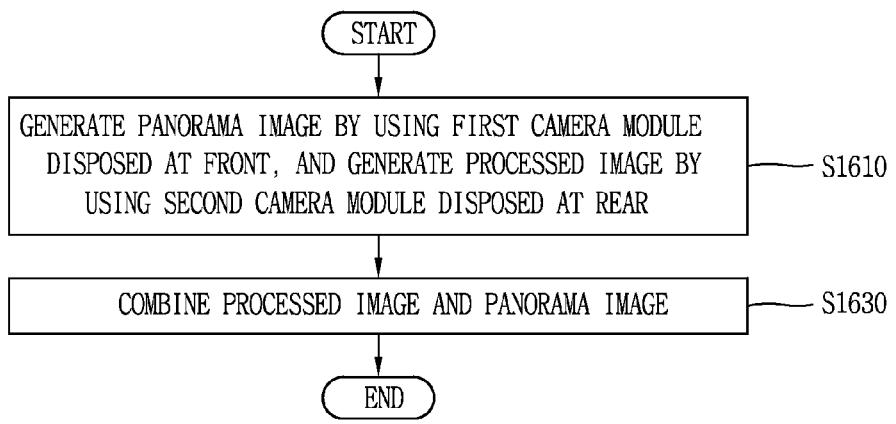

FIGS. 16A and 16B are diagrams illustrating a method of generating a processed image by using images photographed by different cameras.

The mobile terminal according to the present disclosure includes a front at which the touch screen 151 is disposed and a rear opposite to the front. In addition, a first camera module 121a is disposed at the front, and a second camera module 121b is disposed at the rear.

When a user generates a processed image of a subject by using the second camera module 121b, an ambient environment (or external environment) of the subject is captured by the first camera module 121a.

For example, as shown in FIG. 16A, the user may photograph a subject 1600 while moving around the subject 1600 in a state in which the user holds the main body such that the second camera module 121b faces the subject 1600. In this case, a processed image is generated by a plurality of images continuously captured by the second camera module 121b.

Meanwhile, ambient environments existing at the outside of the subject 1600 may be continuously captured by the first camera module 121a, and the controller 180 may generate a panorama image by using a plurality of images captured by the first camera module 121a. That is, the controller 180 may simultaneously generate the processed image and the panorama image by using the plurality of images captured by the first camera module 121a and the plurality of images captured by the second camera module 121b.

Specifically, referring to FIG. 16B, a panorama image is generated by using the first camera module 121a disposed at the front, and a processed image is generated by using the second camera module 121b disposed at the rear (S1610). Next, the processed image and the panorama image are synthesized (S1630).

The processed image and the panorama image, which are simultaneously generated, may be synthesized as one image. That is, the controller 180 may synthesize the processed image and the panorama image. Specifically, the controller 180 may divide the entire area of the processed image into an area in which a subject is included and an area in which the subject is not included. The controller 180 may extract the area in which the subject is included and synthesize the extracted area with one area of the panorama image.

The one area of the panorama image may be a predetermined area in the entire area of the panorama image. The predetermined area may be variously modified according to exemplary embodiments. The predetermined area may be edited by a user input.

Although not shown in these figures, a processed image may be generated by the first camera module 121a, and a panorama image may be generated by using the second camera module 121b.

According to the exemplary embodiment, it is possible to synthesize images photographed in different manners in the substantially same space. Also, it is possible to generate a new image such that the user can feel not only a perspective of a subject but also a perspective of an ambient environment of the subject.

Figure 17A:
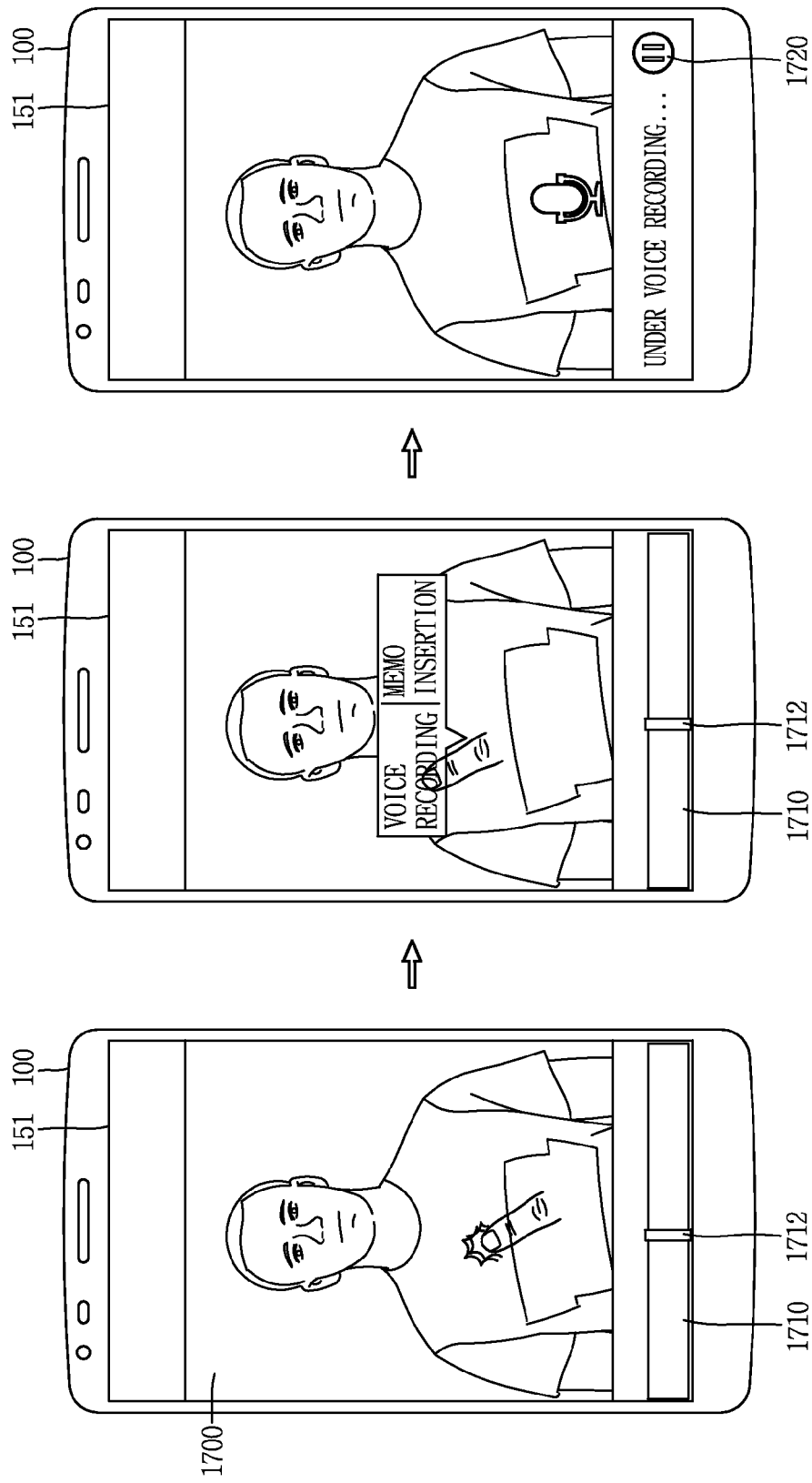
FIGS. 17A and 17B are diagrams illustrating a method of adding a voice memo to a processed image.
Figure 17B:
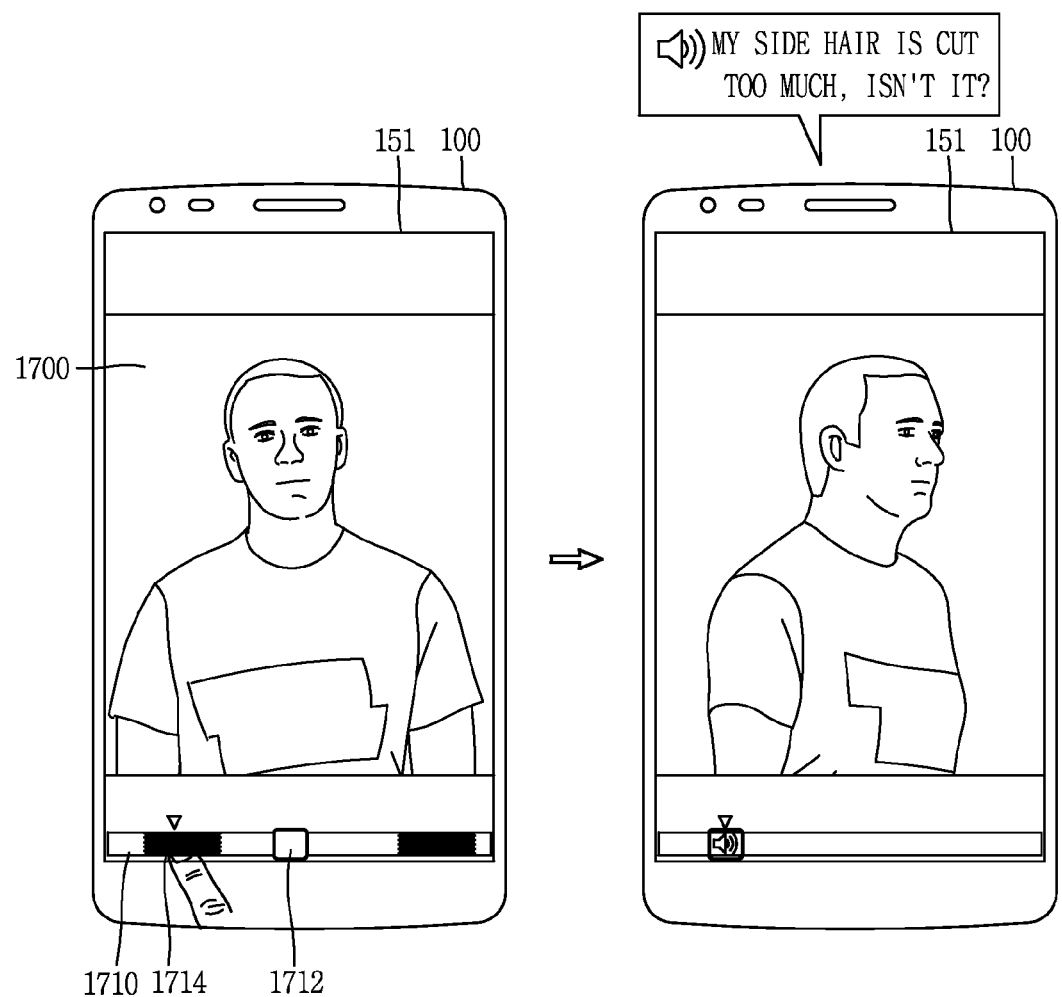

FIGS. 17A and 17B are diagrams illustrating a method of adding a voice memo to a processed image.

The mobile terminal according to the present disclosure may insert a voice memo or text memo into a generated processed image, or may synthesize the voice memo or text memo with the generated processed image. Specifically, when a predetermined user input is applied while the processed image is output, the controller 180 may provide an interface for synthesizing a memo with the processed image. Also, the controller 180 may synthesize a memo input from a user with the processed image, so that when any one image among a plurality of images constituting the processed image is output on the touch screen 151, the memo is output together with the processed image.

A method of synthesizing a memo with a processed image and a method of outputting a processed image with which a memo is synthesized will be described in detail with reference to the accompanying drawings.

First, referring to FIG. 17A, a processed image 1700 is output on the touch screen 151. When the processed image 1700 is output, an indicator 1710 corresponding to the processed image 1700 may be output. The indicator 1710 may include guidance information 1712 for guiding any one image being output on the touch screen among a plurality images constituting the processed image 1700.

Meanwhile, in the state in which the processed image 1700 is output on the touch screen 151, a user input related to a memo input may be input on the touch screen 151. The user input may be, for example, a long touch input touching the touch screen 151 long for a reference time or a double touch input continuously tapping a predetermined area of the touch screen 151 plural times within a reference time. The user input may be variously modified according to exemplary embodiments.

The controller 180 selects any one image among the plurality of images constituting the processed image, based on the user input, and provides an interface for synthesizing a memo with the processed image.

An interface for receiving a voice memo or text memo input from the user is provided in the state in which the selected image is output. In the case of the voice memo, a graphic object 1720 related to a function of starting the voice memo or temporarily stopping or ending the voice memo may be output. In the case of the text memo, a virtual keyboard may be output. The user may input a voice memo or text memo by using the interface. The text memo may be configured as at least one of a text and an image such as an emoticon.

If a memo is input, the controller 180 sets the input memo to correspond to the selected image. In other words, the controller 180 may set the input memo to be output only when the selected image among the plurality of images constituting the processed image is output on the touch screen 151.

Meanwhile, as shown in FIG. 17B, the indicator 1710 may output memo information for guiding the input memo. Specifically, when a memo is included in a processed image being output on the touch screen 151, the controller 180 may allow memo information to be included in an indicator such that the input memo is guided to the user when the indicator corresponding to the processed image is output. The user may recognize the presence of a memo and a point at which the memo is input by using the memo information.

If a touch input is applied to the memo information 1714, any one image corresponding to the memo information 1714 among the plurality of images constituting the processed image 1700 is output on the touch screen 151. Also, a memo is output together with the one image on the touch screen 151. When the memo is a voice memo, the voice memo is output through the sound output unit 152 provided in the mobile terminal. When the memo is a text memo, the text memo is output together with the one image on the touch screen 151.

The user can feel a perspective of a subject by using a processed image, and insert a memo related to the subject into the processed image. Accordingly, the user can record and store thinking and feeling about a subject photographed at a specific photographing angle, and share the thinking and feeling with other people.

Figure 18A:
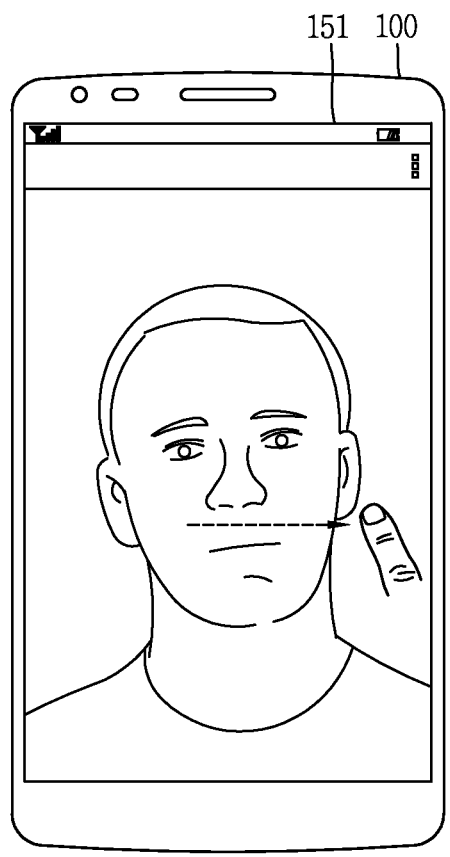
FIGS. 18A and 18B are diagrams illustrating a method of controlling the output of a processed image based on a touch input applied to the processed image.
Figure 18B:
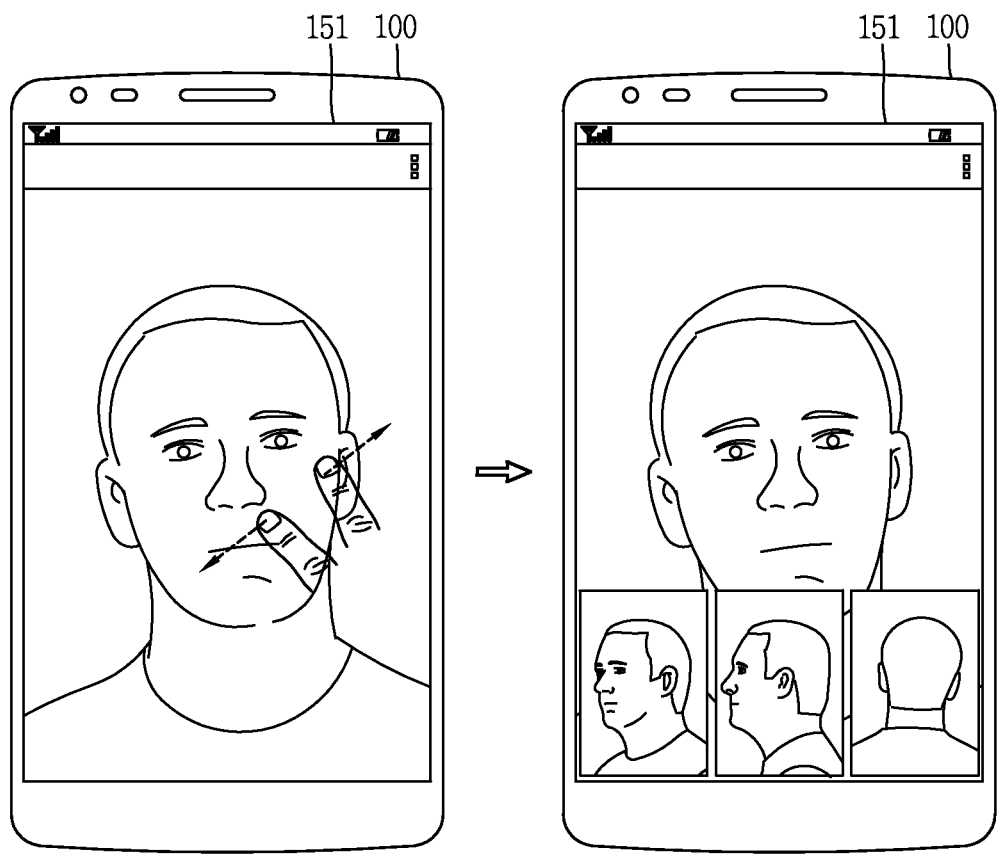

FIGS. 18A and 18B are diagrams illustrating a method of controlling the output of a processed image based on a touch input applied to the processed image.

When a processed image is output, the controller 180 controls the touch screen 151 to output any one image among a plurality of images included in the processed image.

Further, the controller 180 may control the output of the processed image based on a touch input applied to the processed image.

For example, as shown in FIG. 18A, when a flicking input continuously moving from a first point to a second point is sensed, the controller 180 may change any one image being output into another image included in the processed image.

In this case, the another image may be changed depending on a direction, a speed, and a moving distance of the flicking input. A user applies a vertical/lateral flicking input, to view a subject included in the processed image at various angles.

Meanwhile, the controller 180 may divide the entire area of an image being output on the touch screen 151 into a subject area corresponding to a subject and a background area not corresponding to the subject. Further, when a flicking input is applied, the controller 180 may control the touch screen 151 to change only the subject area in a state in which the background area is maintained as it is.

For example, when a processed image is composed of a first image and a second image, the first image may be divided into a first subject area and a first background area, and the second image may be divided into a second subject area and a second background area. If a flicking input is applied in a state in which the first image is displayed, the controller 180 changes the first subject area into the second subject area in a state in which the first background area is maintained as it is. That is, it is possible to obtain an effect as if only a subject rotates in a state in which a background is maintained as it is.

Meanwhile, if a pinch-out input is applied while any one image among a plurality of images included in a processed image is output, the controller 180 may control the touch screen 151 to output another image among the plurality of images included in the processed image together with the one image. Here, the pinch-out input refers to a touch input wherein first and second touch inputs are applied, and at least one of the first and second touch inputs moves in a direction in which the first and second touch inputs are distant from each other. For example, as shown in FIG. 18B, if a pinch-out input is sensed while the first image included in the processed image is output, the controller 180 may control the touch screen 151 to output the first image as it is and output the second image included in the processed image in a partial area of the touch screen 151. Accordingly, the user can simultaneously identify a plurality images photographed at different angles.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a camera;
a sensor;
a memory;
a touch screen; and
a controller configured to:
   cause the touch screen to display a first image received via the camera;
   cause the memory to temporarily store the first image displayed on the touch screen;
   generate a second image comprising a conflation of at least part of the first image and a plurality of consecutive images sequentially received following the first image via the camera in response to sensing by the sensor of first movement of the mobile terminal about a subject included in the first image, wherein the first movement comprises rotation of the mobile terminal about the subject such that images of various sides of the subject are received via the camera during the rotation;
   cause the memory to store the second image;
   obtain a virtual central point of the plurality of consecutive images included in the stored second image;
   set an optimum reproduction speed for each section of the second image according to a type of the subject included in the stored second image such that the optimum reproduction speed is set differently for different types of subjects; and
   cause the touch screen to display the second image such that the plurality of consecutive images are displayed sequentially based on the virtual central point, each section of the second image displayed at a corresponding optimum reproduction speed.

2. The mobile terminal of claim 1, wherein the controller is further configured to:
   recognize a third image among the plurality of images, the third image being an image received at a time point when the first movement ends; and
   cause the touch screen to display guidance information when the third image is recognized, the guidance information indicating that the second image is being generated.

3. The mobile terminal of claim 1, wherein:
   each of the plurality of consecutive images includes an image of the same subject; and the first movement is a rotational movement of at least a threshold angle about the same subject.

4. The mobile terminal of claim 1, wherein the controller is further configured to cause the touch screen to display an indicator corresponding to the second image.

5. The mobile terminal of claim 4, wherein the controller is further configured to:
set a virtual photographing area around the subject included in the first image; and
divide the virtual photographing area into a first area in which photographing is performed based on movement of the mobile terminal and a second area in which no photographing is performed, and
wherein the indicator is configured to guide the movement of the mobile terminal into at least one of the first area or the second area.

6. The mobile terminal of claim 5, wherein when the indicator is configured to guide the movement into the second area, the subject is photographed at various angles.

7. The mobile terminal of claim 5, wherein the controller is further configured to cause the memory to store a third image captured by the camera and displayed on the touch screen independently from the second image in response to a photographing command that is received from a user while the second image is generated, the third image being a still image.

8. The mobile terminal of claim 7, wherein:
the controller is further configured to cause the touch screen to display a thumbnail image corresponding to the independently stored third image while a preview image is displayed on the touch screen; and
the thumbnail image is displayed together on the touch screen with the indicator.

9. The mobile terminal of claim 5, wherein:
the controller is further configured to cause the memory to store the second image with information related to at least one of the first area or the second area when the generation of the second image is completed; and
the second image is stored as a single file.

10. The mobile terminal of claim 9, wherein the controller is further configured to:
cause the memory to store information related to the first area and the second area such that the stored information is associated with the stored second image;
recognize that a preview image captured by the camera includes an image of the subject that matches the subject included in the stored second image; and
cause the touch screen to display a last image among the plurality of consecutive images included in the second image to allow follow-up photographing of the subject from the last image based on the information related to the first area and the second area.

11. The mobile terminal of claim 10, wherein the preview image and the last image are displayed to overlap each other.

12. The mobile terminal of claim 11, wherein the controller is further configured to generate a third image based on the stored second image in response to further movement of the mobile terminal about the subject when the preview image matches the last image.

13. The mobile terminal of claim 1, wherein:
at least two different optimum reproduction speeds are set for at least two sections of the second image when the subject is a first type of subject such that a first section of the second image is displayed at a first reproduction speed and a second section of the second image is displayed at a second reproduction speed subsequent to the displaying of the first section; and
a single optimum reproduction speed is set for all sections of the second image when the subject is a second type of subject such that the all sections are displayed at a same reproduction speed.

14. The mobile terminal of claim 1, wherein:
the controller is further configured to cause the touch screen to display a graphic object while the second image is displayed; and
the graphic object is configured to guide a photographing attribute for each reproduction section with respect to all reproduction sections of the stored second image.

15. The mobile terminal of claim 14, wherein the photographing attribute includes at least one of a photographing angle defined by the camera and the subject, a moving direction of the camera, a moving speed of the camera, or a magnification of the camera.

16. The mobile terminal of claim 15, wherein the controller is further configured to adjust a reproduction speed of the plurality of consecutive images based on the photographing attribute when the stored second image is displayed.

17. The mobile terminal of claim 1, wherein the controller is further configured to:
detect a movement of the mobile terminal sensed by the sensor while the stored second image is displayed: and
cause the touch screen to display images included in the second image in an order corresponding to the detected movement based on the virtual central point.

18. The mobile terminal of claim 17, wherein the controller is further configured to cause the touch screen to stop the displaying of the second image and to display one image among the first image and the plurality of consecutive images when the detected movement satisfies a predetermined condition while the stored second image is displayed.

19. The mobile terminal of claim 1, wherein:
the mobile terminal includes a front side at which the touch screen is disposed and a rear side that is opposite to the front side;
the camera includes a first camera disposed at the front side and a second camera disposed at the rear side; and
the controller is further configured to generate the second image by using images received via the second camera while concurrently generating a panoramic image obtained by capturing an external environment, using images captured by the first camera.

20. The mobile terminal of claim 19, wherein the controller is further configured to combine the second image with a portion of the panoramic image including an image of the subject.

* * * * *